United States Patent
Bennett

(10) Patent No.: US 7,583,625 B2
(45) Date of Patent: Sep. 1, 2009

(54) ACCESS POINT MULTI-LEVEL TRANSMISSION POWER AND PROTOCOL CONTROL BASED ON THE EXCHANGE OF CHARACTERISTICS

(75) Inventor: James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 618 days.

(21) Appl. No.: 11/398,930

(22) Filed: Apr. 6, 2006

(65) Prior Publication Data

US 2007/0238417 A1  Oct. 11, 2007

(51) Int. Cl.
*H04W 4/00* (2006.01)

(52) U.S. Cl. ............. 370/313; 370/311; 370/338; 370/329; 370/347; 370/335; 455/41.2; 455/574; 455/343.5; 455/522; 455/3.01; 455/69

(58) Field of Classification Search ........... 455/522, 455/69, 574, 343.1, 3.01, 41.2; 370/335, 370/338, 311, 347, 329

See application file for complete search history.

(56) References Cited

U.S. PATENT DOCUMENTS

| | | | | |
|---|---|---|---|---|
| 5,129,098 A | * | 7/1992 | McGirr et al. ............. | 455/69 |
| 5,241,542 A | * | 8/1993 | Natarajan et al. ........... | 370/311 |
| 5,265,119 A | * | 11/1993 | Gilhousen et al. .......... | 370/335 |
| 5,267,262 A | * | 11/1993 | Wheatley, III ............. | 455/522 |
| 5,278,831 A | * | 1/1994 | Mabey et al. .............. | 370/349 |
| 5,333,175 A | * | 7/1994 | Ariyavisitakul et al. ..... | 455/423 |
| 5,410,738 A | * | 4/1995 | Diepstraten et al. ......... | 455/528 |
| 5,528,593 A | * | 6/1996 | English et al. ............. | 370/391 |
| 5,594,731 A | * | 1/1997 | Reissner .................... | 370/338 |
| 5,621,735 A | * | 4/1997 | Rochester et al. ........... | 370/346 |

(Continued)

FOREIGN PATENT DOCUMENTS

EP  1 587 221 A  10/2005

OTHER PUBLICATIONS

IEEE; "IEEE 802.11h: Amendment 5: Spectrum and Transmit Power Management Extensions in the 5 GHz band in Europe" IEEE STD 802.11H, Oct. 14, 2003.

*Primary Examiner*—Sharad Rampuria
(74) *Attorney, Agent, or Firm*—Garlick Harrison & Markison; Bruce E. Stuckman

(57) ABSTRACT

A wireless access point and multiple wireless terminals exchange utilization, status, mobility and reception characteristics. Each wireless terminal generates reception characteristics based on transmissions received from the wireless access point and from other devices in the network. In one operating mode, the characteristics gathered by the wireless devices are forwarded to the wireless access point, and, based on all received characteristics, the wireless access point selects its own transmission power for different types of the transmission. In another mode, all characteristics are exchanged between every wireless terminal and the access point so that each can independently or cooperatively make transmission power control decisions. In a further mode, the wireless access point adjusts protocol parameters based on an assessment of the characteristics received from the client devices. The utilization, status, mobility, and reception characteristics include received signal strength, error rates, estimated battery life, availability of unlimited power, active versus sleep mode ratios, anticipated bandwidth utilization, coding schemes available, deterministic/non-deterministic requirements, encryption and security requirements, quality of service requirements, position, velocity, stationary status, etc. Gathering of such characteristics involves both retrieval of preset parameters from memory and generating parameters based on received transmissions (including test packets).

45 Claims, 10 Drawing Sheets

U.S. PATENT DOCUMENTS

| | | | |
|---|---|---|---|
| 5,740,363 A * | 4/1998 | Siep et al. | 709/200 |
| 5,949,776 A * | 9/1999 | Mahany et al. | 370/338 |
| 6,075,974 A * | 6/2000 | Saints et al. | 455/69 |
| 6,366,763 B1 * | 4/2002 | Ue et al. | 455/69 |
| 6,535,723 B1 * | 3/2003 | Jiang et al. | 455/245.1 |
| 6,856,786 B2 * | 2/2005 | Belostotsky et al. | 455/3.03 |
| 6,904,021 B2 * | 6/2005 | Belcea | 370/252 |
| 6,975,864 B2 * | 12/2005 | Singhal et al. | 455/438 |
| 7,058,029 B2 * | 6/2006 | Khawer et al. | 370/318 |
| 7,103,314 B2 * | 9/2006 | Li | 455/41.2 |
| 7,110,783 B2 * | 9/2006 | Bahl et al. | 455/516 |
| 7,161,916 B2 * | 1/2007 | Malladi et al. | 370/332 |
| 7,167,732 B2 * | 1/2007 | Choi et al. | 455/574 |
| 7,203,463 B2 * | 4/2007 | Bahl et al. | 455/68 |
| 7,330,740 B2 * | 2/2008 | Bennett et al. | 455/574 |
| 2002/0132603 A1 * | 9/2002 | Lindskog et al. | 455/343 |
| 2003/0027587 A1 * | 2/2003 | Proctor, Jr. | 455/522 |
| 2003/0198196 A1 * | 10/2003 | Bahl et al. | 370/311 |
| 2004/0229621 A1 * | 11/2004 | Misra | 455/445 |
| 2005/0059347 A1 * | 3/2005 | Haartsen | 455/41.2 |
| 2005/0152283 A1 * | 7/2005 | Ritzenthaler | 370/254 |
| 2005/0213532 A1 | 9/2005 | Liu et al. | |
| 2006/0268924 A1 * | 11/2006 | Marinier et al. | 370/445 |

* cited by examiner

ACCESS POINT MULTI-LEVEL TRANSMISSION POWER AND PROTOCOL CONTROL BASED ON THE EXCHANGE OF CHARACTERISTICS

TECHNICAL FIELD OF THE INVENTION

This invention relates generally to wireless communication systems, and more particularly to transmit power control and protocol control of wireless communication devices within such wireless communication systems.

BACKGROUND OF THE INVENTION

Wireless communication systems are known to support wireless communications between wireless communication devices affiliated with the system. Such wireless communication systems range from national and/or international cellular telephone systems to point-to-point in-home wireless networks. Each type of wireless communication system is constructed, and hence operates, in accordance with one or more standards. Such wireless communication standards include, but are not limited to IEEE 802.11, Bluetooth, advanced mobile phone services (AMPS), digital AMPS, global system for mobile communications (GSM), code division multiple access (CDMA), wireless application protocols (WAP), local multi-point distribution services (LMDS), multi-channel multi-point distribution systems (MMDS), and/or variations thereof.

An IEEE 802.11 compliant wireless communication system includes a plurality of client devices (e.g., laptops, personal computers, personal digital assistants, etc., coupled to a station) that communicate over a wireless link with one or more access points. The transmitting device (e.g., a client device or access point) transmits at a fixed power level regardless of the distance between the transmitting device and a targeted device (e.g., station or access point). Typically, the closer the transmitting device is to the targeted device, the less error there will be in the reception of the transmitted signal. However, as is generally understood in the art, wireless transmissions may include some error and still provide an accurate transmission. Thus, transmitting at power levels that provide too few errors is energy inefficient.

As is also generally understood in the art, many wireless communications systems employ a carrier-sense multiple access (CSMA) protocol that allows multiple communication devices to share the same radio spectrum. Before a wireless communication device transmits, it "listens" to the wireless link to determine if the spectrum is in use by another station to avoid a potential data collision. At lower received power levels, this protocol can lead to a hidden terminal problem when two devices, generally spaced far apart, are both trying to communication with a third device in the middle. While the device in the middle can "hear" the two devices on the periphery, these two devices cannot hear one another—potentially creating data collisions with simultaneous transmissions destined for the middle device.

Further limitations and disadvantages of conventional and traditional approaches will become apparent to one of ordinary skill in the art through comparison of such systems with the present invention.

SUMMARY OF THE INVENTION

The present invention sets forth a wireless network, access point, client device, integrated circuit and methods that determine transmission power and protocol parameters based on received characteristics substantially as shown in and/or described in connection with at least one of the figures, as set forth more completely in the claims that follow.

DETAILED DESCRIPTION

Figure 1:
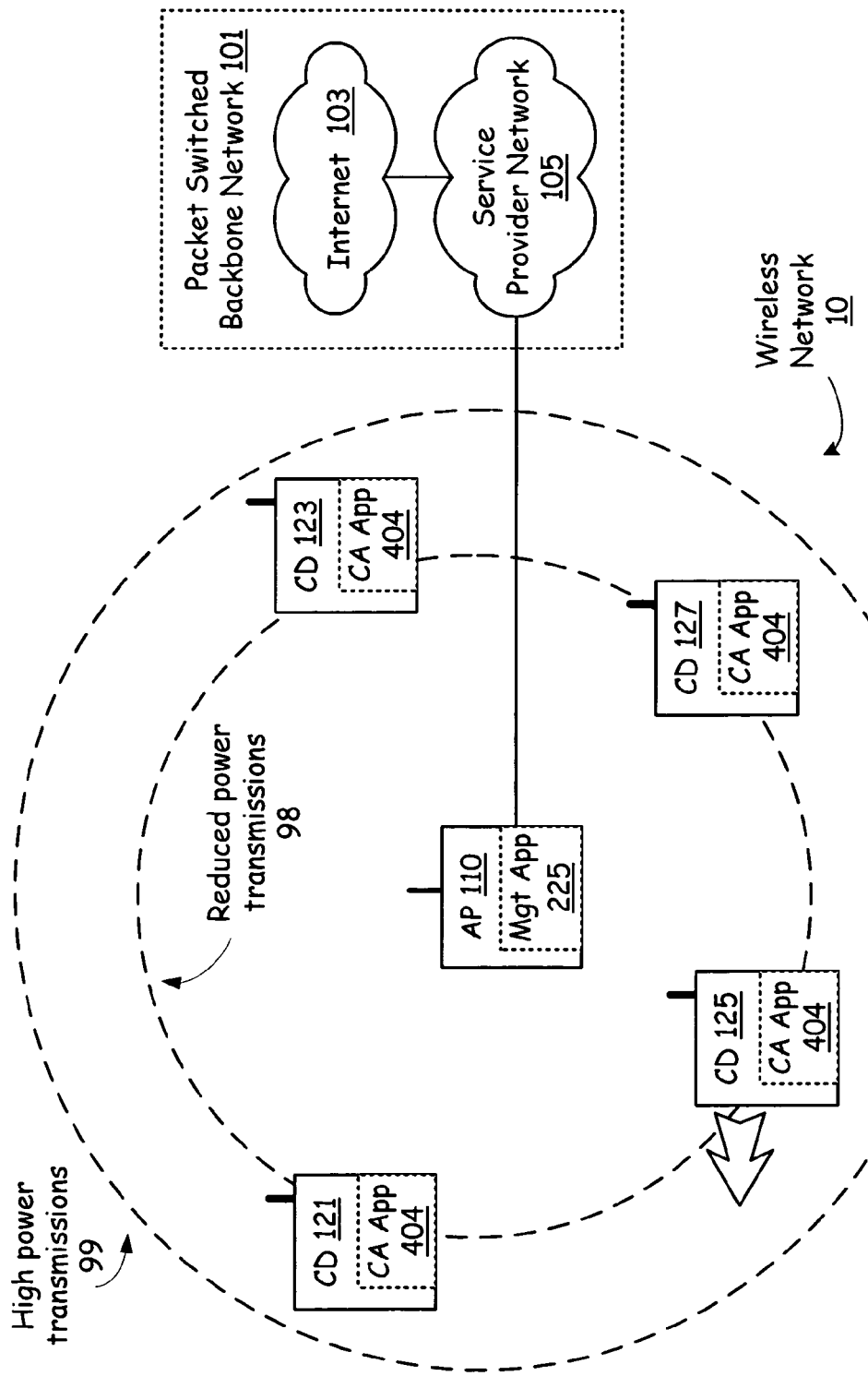
FIG. 1 presents a pictorial representation of a wireless network 10 in accordance with an embodiment of the present invention.

FIG. 1 presents a pictorial representation of a wireless network 10 in accordance with an embodiment of the present invention. A wireless network 10 includes an access point 110 that is coupled to packet switched backbone network 101. The access point 110 manages communication flow destined for and originating from each of client devices 121, 123, 125 and 127 over a wireless network 10. Via the access point 110, each of the client devices 121, 123, 125 and 127 can access service provider network 105 and Internet 103 to, for example, surf web-sites, download audio and/or video programming, send and receive messages such as text messages, voice message and multimedia messages, access broadcast, stored or streaming audio, video or other multimedia content, play games, send and receive telephone calls, and perform any other activities, provided directly by access point 110 or indirectly through packet switched backbone network 101.

The access point 110 is capable of transmitting high power transmissions 99 and reduced power level transmissions 98 at one or more reduced power levels, depending on the type of transmission, the characteristics of the particular client device to which the transmission is addressed and the characteristics of the other client devices that are associated with the access point 110. The access point 110 includes a management application 225, and each client devices 121, 123, 125 and 127 includes a client assessment application 404. The management application 225 and the client assessment applications 404 of each of the client devices 121, 123, 125 and 127 operate to select adequate transmission power settings that conserve battery power and limit unnecessary electromagnetic radiation. For example, as directed by a client assessment application 404, the client device 121 assesses transmissions from the access point 110 and the client devices 123, 125 and 127. The client device 121 generates reception characteristics based on the assessment. The client device 121 also gathers local status information, anticipated bandwidth utilization characteristics and mobility information, and, based thereon, generates status characteristics, utilization characteristics, and mobility characteristics. The client device 121 delivers the reception characteristics, status characteristics, utilization characteristics and mobility characteristics to the access point 110 for use by the management application 225. According to their client assessment application 404, the other of the client devices 123, 125 and 127 similarly gather and deliver their local status characteristics, utilization characteristics and mobility characteristics along with reception characteristics relating to others of the client devices and the access point 110.

The access point 110, in accordance with the management application 225, also generates its own reception characteristics and utilization characteristics. The management application 225 adjusts the access point's transmission power and controls the transmission power of each of the client devices 121, 123, 125 and 127 based on: 1) the reception characteristics received from each of the client devices 121, 123, 125 and 127 regarding others of the client devices and the access point; 2) locally generated reception characteristics and utilization characteristics regarding each of the client devices 121, 123, 125 and 127; 3) status characteristics from each of the client devices 121, 123, 125 and 127; 4) mobility characteristics from each of the client devices 121, 123, 125 and 127; and 5) utilization characteristics generated by each of the client devices 121, 123, 125 and 127. The access point 110 achieves such control by causing the access point 110 to deliver control instructions to each of the client devices 121, 123, 125 and 127 via the wireless network. Each of the client devices 121, 123, 125 and 127 respond to the control instructions by adjusting its transmit power. Such overall control takes advantage of particular, current circumstances, including current operational status, relative positions and properties of any the network nodes (e.g., the access point 110 and the client devices 121, 123, 125 and 127).

As used herein, "reception characteristics" includes any data, generated based on received wireless transmissions, that rates or can be used to rate the quality, accuracy or strength of such received wireless transmissions. For example, reception characteristics might include any one or more of a Received Signal Strength Indication (RSSI), bit/packet error, current/historical error rates, multipath interference indications, Signal to Noise Ratio (SNR), fading indications, etc.

Status characteristics includes any data relating to an underlying device's prior, current or anticipated readiness, abilities or capacity for participating on the wireless network. Status characteristics include, for example, the amount of power available, such as whether alternating current (AC) power is available or only battery power, and, if battery power, anticipated battery life at various transmission power levels and at various levels of participation, etc. Status characteristics also include whether a device is currently "sleeping" or inactive or in a low power idle state. It may also include historical information anticipating the current status duration and anticipated status characteristics changes. Status characteristics may also include status information relating to each underlying communication software application that runs on a client device. For example, on a single client device two communication applications might be present with one in an inactive state and the other actively communicating. Status characteristics would identify such activity and inactivity.

Utilization characteristics include any parameter that indicates a prior, current or anticipated bandwidth requirement, usage or usage characteristic. Utilization characteristics might include anticipated QoS (Quality of Service) requirements, upstream/downstream bandwidth usage, bandwidth usage characteristics, idle versus active status characteristics, underlying data/media types (e.g., voice, video, images, files, database data/commands, etc.) and corresponding requirements, etc.

Mobility characteristics include for example indications as to whether the underlying device is: 1) permanently stationary, e.g., a desktop client computer, game console, television, set top box or server; 2) capable of mobility, e.g., a cell phone or mobile VoIP (Voice over Internet Protocol) phone, PDA (Personal Digital Assistant), and palm, laptop or pad computer; and 3) currently moving, e.g., any one or more of current position and direction, velocity and acceleration information.

In operation, the access point 110 is capable of transmitting at a selected power level that is based on factors such as the type of transmission, the reception characteristics, status characteristics, utilization characteristics, mobility characteristics, and the particular target device for the transmission. For instance, access point 110 can transmit periodic beacons at a high power level that include information relating to the access point 110 and the packet switched backbone network 101 such as a service set identifier (SSID) and network name. These beacons are used to support new associations with client devices 121, 123, 125 and 127 that enter the proximity of access point 110 or that otherwise become active within this proximity. Reception characteristics relating to how well the client devices 121, 123, 125 and 127 receive these beacon transmissions can be generated by the client assessment application 404 of these client devices and transmitted back to the access point 110. In response, management application 225 determines a customized power level for the access point to transmit to each client device 121, 123, 125, and 127 that may be reduced from the maximum power output, but that provides sufficient power to be received by that particular client device. In addition, management application 225 determines an intermediate power level that is sufficient to be received by all of the client devices 121, 123, 125 and 127. Specific packets, such as all acknowledgements (ACKs), every other ACK, every nth ACK etc., all data packets, occasional data packets, etc. are transmitted by the access point 110 at the intermediate power level that will reach all of the client devices 121, 123, 125 and 127, with the remaining packets transmitted at the power level that is customized for the particular client device 121, 123, 125 or 127 to which the packets are addressed.

Reducing the transmitted power of the access point, and of the client devices themselves, reduces the power consumption of these devices—potentially extending the life of the devices and the battery life for devices that are battery powered. In addition, the resulting wireless network 10 is more "transmission friendly" to neighboring networks. The transmission of beacons at high power promotes the association of new client devices to wireless network 10. The transmission of packets addressed to a particular client device 121, 123, 125 or 127, at a customized power level enhances the power efficiency of the network. The transmission of selected packets at the intermediate power level, that will reach all of the client devices 121, 123, 125 and 127 that are associated with access point 110, helps reduce hidden terminal problems by letting other client devices know that a device is transmitting.

By way of example, the access point 110 may transmit at ten discrete power levels at 1 dB increments, say 10 through 1, with 10 corresponding to the full power transmission, 9 corresponding to a 1 dB reduction in transmitted power, 8 corresponding to a 2 dB reduction in power, etc. Based on reception characteristics received from client devices 121, 123, 125, and 127, management application 225 of access point 110 determines the following power levels are sufficient to be received by each client device:

| Client Device | Power level |
|---|---|
| 121 | 5 |
| 123 | 6 |
| 125 | 8 |
| 127 | 6 |

Access point 110 transmits beacons at a power level of 10. Access point 110 transmits every other ACK with a power level of 8, sufficient to be received by each client device 121, 123, 125 and 127. Other packets from access point 110 are transmitted at the power level assigned to the addressee client device. Packets addressed to client devices 123 or 127 are transmitted at power level 6, packets addressed to client device 121 are transmitted at power level 5, packets addressed to client device 125 are transmitted at power level 8.

While the reception characteristics are described above as generated in response to access point beacons, the reception characteristics can also be collected by a given one of the client devices 121, 123, 125 and 127 through a test mode and through "sniffing". In the test mode, the access point 110 directs each of the client devices to respond with reception characteristics in response to transmissions from the access point 110 at one or more transmission power levels. Also, in the test mode, the access point 110 directs one of the client devices 121, 123, 125 and 127 to transmit at one or more selected power levels and all others to generate and deliver reception characteristics in response. The access point 110 may similarly direct each of the others of the client devices 121, 123, 125 and 127 to send the test transmissions and correspondingly have the others respond by generating reception characteristics. Testing can be conducted periodically or whenever conditions indicate that transmission power adjustments may be needed. Devices that are mobile may undergo testing more often than those that are stationary. Collecting reception characteristics through sniffing involves a client device listening to ordinary (not test) transmissions from and to the access point 110. The access point 110 may request reception characteristics based on such sniffing or may be delivered same occasionally or periodically (e.g., as significant changes are detected) and without request by each client device. Similarly, without request, status characteristics, utilization characteristics and mobility characteristics may be reported as significant changes therein occur by a client device to the access point 110.

Further, while the selected power levels used by access point 110 to transmit to each client device are described above as being determined based on reception characteristics, management application 225 can likewise use status characteristics, utilization characteristics and mobility characteristics and with periodic updates thereto, to determine the customized power levels for transmission to each client device 121, 123, 125, and 127 and the intermediate power level that will reach all client devices. For example, the client device 123 generates reception characteristics from transmissions between the client device 121 and the access point 110. The client device 123 delivers the reception characteristics generated to the access point 110. The client device 123, a stationary desktop computer, has access to AC power, and has a full-duplex, video streaming application running in an active communication state which requires significant bandwidth and QoS. The client device 123 communicates such corresponding status characteristics, utilization characteristics and mobility characteristics to the access point 110. The client device 125, a battery powered device with significant remaining battery life, is operating with little communication traffic either direction. The client device 125 generates reception characteristics for all communication exchanges. The client devices 121 and 127, portable communication devices with minimal power resources, both have one or more communication applications active that require light but continuous bandwidth demands. Both also generate reception characteristics regarding communication flowing in all directions. Such reception characteristics and underlying status characteristics, utilization characteristics and mobility characteristics are communicated to the access point 110. The management application 225 of the access point 110 considers all such received communications, and for example, may operate at the higher overall transmission power with protocol supported QoS and priority when transmitting to client device 123. When transmitting at the intermediate power level, all of the other client devices should receive the transmissions and attempt to avoid simultaneous, interfering transmissions. Further, the management application 225 may increase the power level for transmission to client device 125, given the mobility of this device and the potentially changing reception characteristics that this client device may experience.

For transmission to the access point 110 from the client devices 121, 123, 125 and 127, the management application 225 can determine a transmission power level, based on the reception characteristics (including receptions by client devices 121, 123, 125 and 127 of transmissions from other client devices), status characteristics, utilization characteristics and mobility characteristics, that are transmitted by access point 110 to each respective client device. By way of further examples, the client devices 121 and 127 may each adequately receive transmissions from the access point 110. However, an analysis of their reception characteristics by access point 110 may reveal that client device 127 cannot detect transmissions from client device 121 and vice versa. In this scenario, the access point 110 may choose to boost the transmission power of one or both of the client devices 121 and 127 to avoid potential hidden terminal problems that could occur when client device 121 and 127 attempt to transmit to access point 110. An analysis of reception characteristics and status characteristics by access point 110 may also reveal that the client device 123 is easily detected by each of the other devices and that it is running low on battery power. In response, the access point 110 can select a reduced transmission power level for the client device 123 that extends its battery life. An analysis of reception characteristics and mobility characteristics by access point 110 may reveal that the client device 125 is highly mobile. Rather than relying solely on reception characteristics, the access point 110 selects a transmission power level for the client device 125 that takes into consideration its possible movement about the transmission range of the wireless network 10.

Also to manage power and transmissions, the management application 225 is further operable to manage the protocol or protocols used in communicating between the access point 110 and the client devices 121, 123, 125 and 127 and power levels inherent in and associated therewith. In one mode of operation, management application 225 can selectively adjust one or more protocol parameters, such as the packet length, data rate, forward error correction, error detection, coding scheme, data payload length, contention period, and back-off parameters used by access point 110 in communication with one or more of the client devices 121, 123, 125 and 127, based on the analysis of the reception characteristics, status characteristics, utilization characteristics, and mobility characteristics. In this fashion, the protocol parameters can be adapted for power conservation and to minimize unnecessary transmission power utilization based on the conditions of the network. These conditions for example include not only the mobility, utilization, status, and reception characteristics of a particular device, but the mobility, utilization, status, and reception characteristics of a plurality of devices, and how well each client device receives other client devices.

For example, in the event that a client device, such as client device 121, has difficulty detecting transmissions from client device 123, access point 110 can modify the protocol parameters so that transmissions by client device 123 include more aggressive error correcting codes, increased back-off times and/or smaller data payloads or packet length to increase the chances that a packet will be received in the event of contention by client device 121. In addition, decreasing the packet length can increase the frequency of acknowledgements transmitted by access point 110. These acknowledgements can be transmitted at a power level sufficient to be heard by client device 121. With increased back-off times, client device 121 has less opportunity to create a potential contention.

In a further mode of operation, access point 110 and client devices 121, 123, 125 and 127 can operate using a plurality of different, and potentially complimentary, protocols having different protocol parameters. Access point 110 can likewise select a particular one of a plurality of protocols that suits the particular conditions present in the wireless network 10, as determined based on an assessment of utilization characteristics, status characteristics, mobility characteristics and/or reception characteristics. For instance, an access point can select from 802.11(n), 802.11(g) or 802.11(b) protocols having different protocol parameters, data rates, etc, based on the particular protocol best suited to accommodate the characteristics of the client devices 121, 123, 125 and 127 that are present.

It should be noted that these examples are merely illustrative of the many functions and features presented in the various embodiments of the present invention set forth more fully in conjunction with the description and claims that follow.

Figure 2:
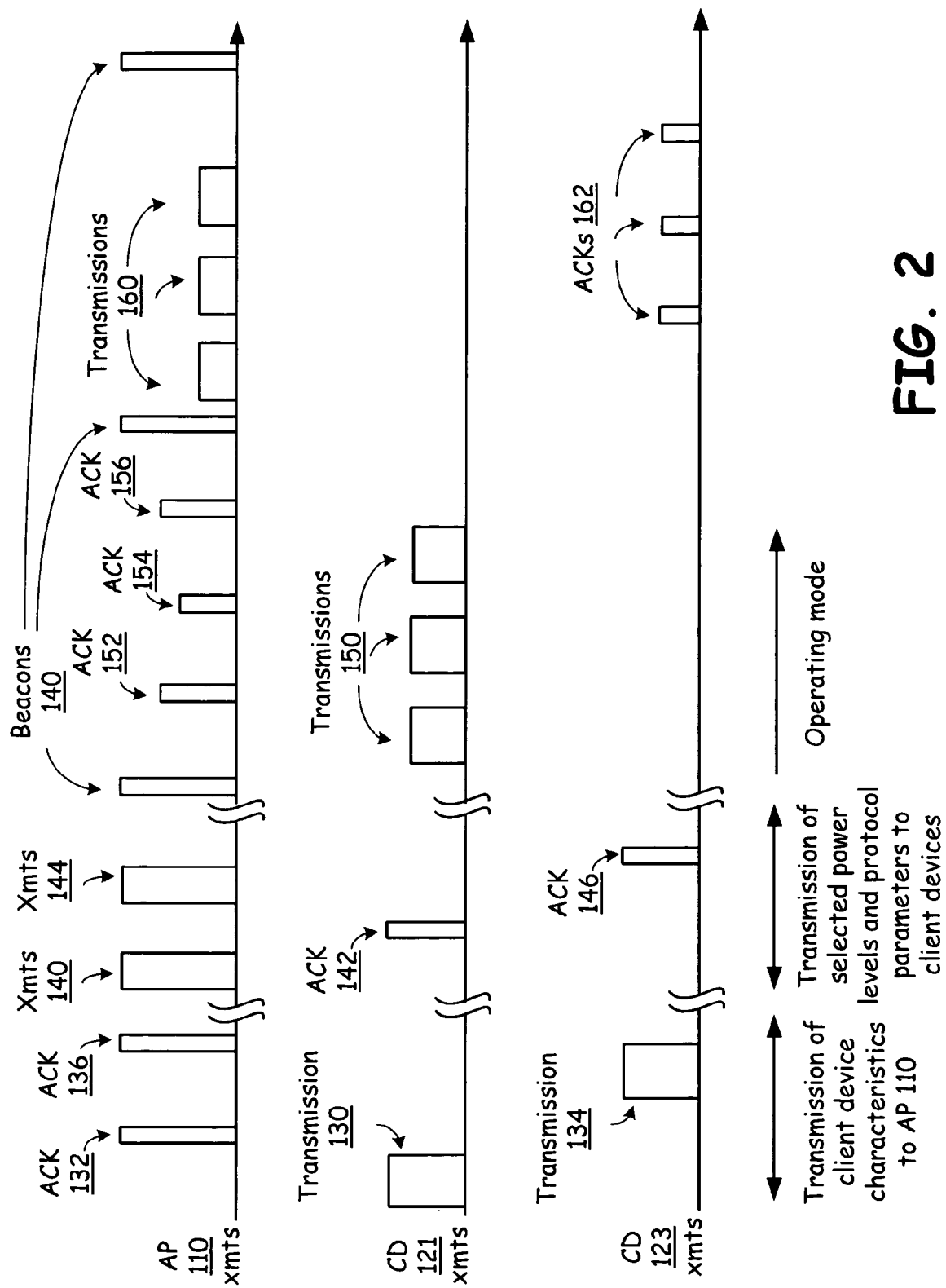
FIG. 2 presents a timing diagram of transmissions by the access point 110 and the client devices 121 and 123 in accordance with an embodiment of the present invention.

FIG. 2 presents a timing diagram of transmissions by the access point 110 and the client devices 121 and 123 in accordance with an embodiment of the present invention. In particular, FIG. 2 shows exchanges between access point 110 and client device 121 and exchanges between access point 110 and client device 123. While exchanges between the access point 110 and two client devices are shown, the invention herein likewise applies for use with a greater number of client devices. In this diagram, transmissions such as data packets, acknowledgements and beacons are represented by blocks whose relationship to the timing of other events can illustrate a mode of operation, however, the durations of these blocks are not shown to scale. The relative amplitude of these blocks represents the power level of a particular transmission, with taller blocks being transmitted at greater power and shorter blocks being transmitted at lower power.

Prior to the beginning of the time shown by FIG. 2, client device 121 has generated first characteristics by evaluating transmissions, such as beacons, test transmissions or routine on-going transmissions, from both the access point 110 and other client devices, and further, by evaluating its own utilization, status and mobility. Likewise, client device 123 has generated second characteristics by evaluating transmissions from both the access point 110 and other client devices, and its own utilization, status and mobility. Client device 121 transmits, at a preset power level, transmission 130 to the access point 110 that includes the first characteristics. Access point generates an acknowledgement 132 in response at a first power level, such as a high or full power level. Client device 123 transmits, at a preset power level, transmission 134 to the access point 110 that includes the second characteristics. Access point generates an acknowledgement 136 in response at the high power level.

The management application 225 of access point 110, having received the first characteristics from client device 121 and second characteristics from client device 123. assesses both the first characteristics and the second characteristics and, based on the assessment, selects both a second power level of the plurality of power levels for transmissions by the access point 110 to the client device 121 and a third power level of the plurality of power levels for transmissions by the access point 110 to the client device 123. Although not shown, the access point 110 may select an alternate protocol, based on such assessment, and coordinate switch-over from that currently being used to the alternate protocol.

Assuming a protocol change is not warranted, the management application 225 determines a selected power level for transmissions by the client device 121 and a selected power level for transmissions by the client device 123 and other possible protocol parameters that are sent, respectively, to clients devices 121 and 123 in transmissions 140 and 144 that are acknowledged, respectively, by acknowledgements 142 and 146.

After the transmission powers and protocol parameters for the access point 110 and the client devices 121 and 123 are established, the operating mode begins. In this example, the access point 110 transmits at a highest power level for the periodic beacons 140. Transmissions to client device 121, such as acknowledgement 154 are at a first reduced power level that is sufficient for reception by client device 121. Transmissions to client device 123, such as transmissions 160 are at a second reduced power level that is sufficient for reception by client device 123. Periodic acknowledgements, such as acknowledgements 152 and 156 are at a higher power level that can be heard by all of the client devices in the network. Transmissions 150 by client device 121 are at the power level selected by access point 110 for this device based on the characteristics of client device 121. Acknowledgements 162 by client device 123 are transmitted at the power level selected by access point 110 for client device 123 device based on the characteristics of this device.

In this fashion, access point 110 transmits selected wireless transmissions, such as beacons 140 at a first power level, to reach both client devices 121 and 123 and potentially other devices that wish to associate with wireless network 10. Other wireless transmissions, such as periodic acknowledgements 152 and 156 by the access point 110, are sent at a second power level that is selected to support both delivery of the packets to the client device 121 and detection of these transmissions by the client device 123, the first power level being greater than the second power level. In addition, wireless transmissions, such as transmissions 160 are sent at a third power level selected to support receipt of the packets by client device 123 device, the second power level being greater than the third power level.

Alternatively, if circumstances warrant, the access point 110 could choose all of its transmissions other than the highest power beacons to be tailored specifically for the client device 121 even though the client devices 123 cannot hear such transmissions. To combat such hidden terminal condition, the access point 110 commands the client device 121 to transmit at a power level sufficient for the client device 123 to detect. With a protocol that requires at least periodic confirmation by the client device 121 (e.g., interspersed acknowledge packets), even though the client device 121 cannot hear the access point 110, the client device 123 will hear the periodic confirmation transmissions (or payload transmissions from the client device 121), and thus determine that the access point 110 is engaged. At the same time, the access point 110 may determine that the client device 121 can hear transmissions by the access point 110 at power levels only great enough to adequately support the client device 123. Based on this determination, the access point 110 might direct the client device 123 to transmit at a power level only sufficient to adequately reach the access point 110 but not the client device 121.

Of course, various other circumstances warrant various other transmission power and protocol configurations. For example, if the access point 110 determines that transmissions from and to the client device 121 can be selected such that they provide adequate performance yet not be heard by the client device 123, the access point 110 may adopt such power levels. Because the client device 123 has indicated an idle status, the access point 110 may accept any unexpected interference from the client device 123 as it exits the idle status to transmit during a communication exchange between the client device 121 and the access point 123. Thereafter, the access point 110 can change power levels to accommodate the both of the client devices 121 and 123 in their active states. Or, instead of merely tolerating such unexpected interference, the access point 110 may employ a different protocol operation or an entirely different protocol to accomodate such circumstances. An example of this would be for the access point 110 to command that the client device 123 only attempt transmissions from the idle state during a fixed period after a beacon and thereafter avoid communication exchanges with the client device 121 during such period. This change might be supported within the current protocol, or might require a change from the current protocol to another. Similarly, instead of switching protocols, the access point 110 may choose to operate two different protocols at the same time, by directing at least one of the two of the client devices 121 and 123 to switch. Further, if the access point 110 detects that the client device 123 is plugged into AC (Alternating Current) power, it may direct the client device 123 to always transmit at a higher or highest power, while directing the client device 121 (that may operate on limited battery power) to transmit at only that necessary to reach the access point 110. Many other circumstances and adaptation by the access point 110 to reduce overall unnecessary transmission power usage by one or more of the client devices 121 and 123 and the access point 110 itself are contemplated.

Figure 3:
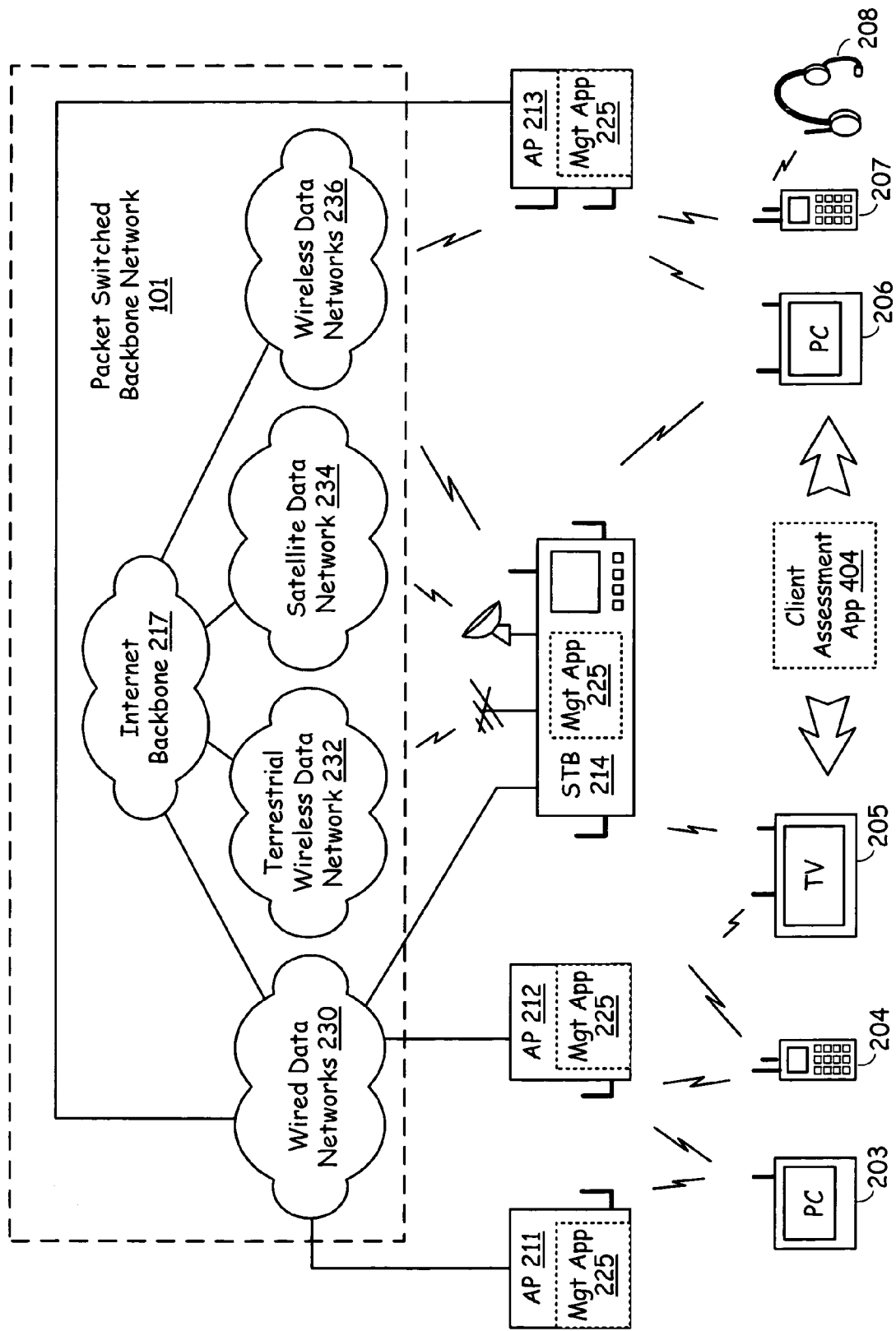
FIG. 3 presents a pictorial representation of a wireless network 10 that shows examples of client devices and various modes of connection between access points and packet switched backbone network 101 in accordance with an embodiment of the present invention.

FIG. 3 presents a pictorial representation of a wireless network 10 that shows examples of client devices and various modes of connection between access points and packet switched backbone network 101 in accordance with an embodiment of the present invention. Packet switched backbone network 101 includes wired data networks 230 such as a cable, fiber, or other wired or hybrid network for providing access, such as narrowband, broadband or enhanced broadband access to content that is local to wired data network 230 or is otherwise accessed through Internet backbone 217. In particular, examples of wired data networks 230 include a public switched telephone network (PSTN), cable television network or private network that provides traditional plain old telephone service, narrowband data service, broadband data service, voice over internet protocol (IP) telephony service, broadcast cable television service, video on demand service, IP television service, and/or other services.

Packet switched backbone network 101 further includes a terrestrial wireless data network 232 that includes a cellular telephone network, personal communications service (PCS), general packet radio service (GPRS), global system for mobile communications (GSM), or integrated digital enhanced network (iDEN). These networks are capable of accessing wired data networks 230 through internet backbone 217 and for providing the many of the services discussed in conjunction wired data networks 230 in accordance with international wireless communications standards such as 2G, 2.5G and 3G.

Packet switched backbone network 101 also includes satellite data network 234 for providing access to services such as satellite video services, satellite radio service, satellite telephone service and satellite data service. In addition, packet switched backbone network 101 includes other wireless data networks 236 such as a WiMAX network, ultra wideband network, edge network, Universal Mobile Telecommunication System, etc., for providing an alternate medium for accessing any of the services previously described.

Access points 211-213 provide access to WAN 101 through a wired connection to wired data networks 230. In addition, access point 213 is capable of providing access to packet switched backbone network 101 through wireless data networks 236. Set top box (STB) 214 includes the functionality of access points 211, 212, and/or 213 while further including optional access to terrestrial wireless data network 232, and satellite data network 234. In particular, STB 214 optionally includes additional functions and features directed toward the selection and processing of video content such as satellite, cable or IP video content. While the term "access point" and "set top box" have been used separately in the context of this discussion, the term "access point" shall include both the functionality and structure associated with a set top box, including but not limited to, STB 214.

A plurality of client devices are shown that include personal computers (PC) 203 and 206, wireless telephones 204 and 207, television (TV) 205, and wireless headphones 208. These client devices are merely examples of the wide range of client devices that can send data to and receive data from access points 211-213 and STB 214. While each of these client devices are shown pictorially as having integrated transceiver circuitry for accessing a corresponding access point, an separate wireless interface device may likewise be coupled to the client module via a port such as a Universial Serial Bus (USB) port, Personal Computer Memory Card International Association (PCMCIA) Institute of Electrical and Electronics Engineers (IEEE) 488 parallel port, IEEE 1394 (Firewire) port, Infrared Data Association (IrDA) port, etc.

Access points 211-213 and STB 214 include a management application 225 and personal computers (PC) 203 and 206, wireless telephones 204 and 207, television (TV) 205, and wireless headphones 208, include client assessment application 404 that allow these devices to implement the power management method and structure in accordance with an embodiment of the present invention. Further discussion of these wireless networks, access points, client devices, including methods for use therewith will be set forth in association with FIGS. 3-9 and the appended claims.

Figure 4:
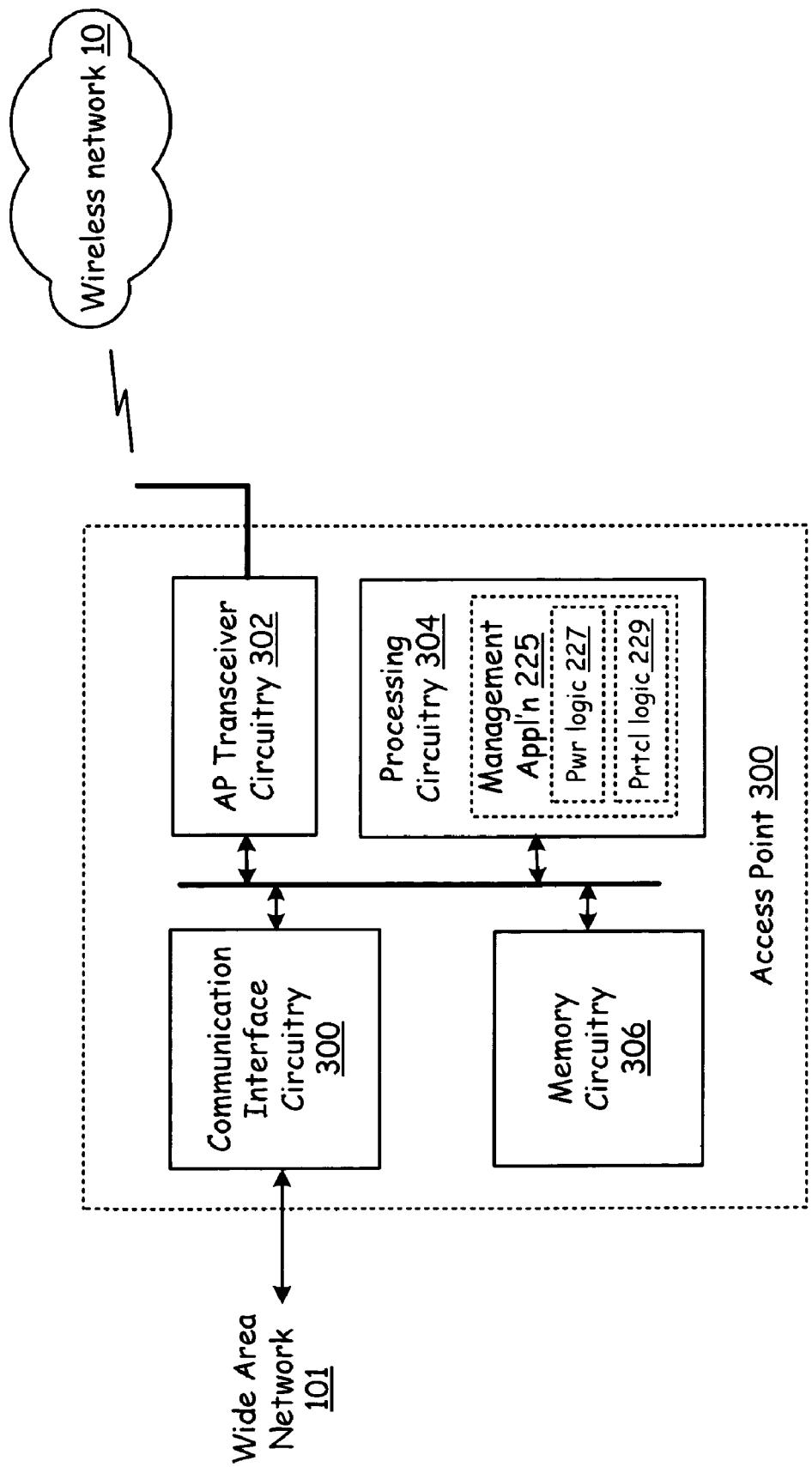
FIG. 4 presents a block diagram representation of an access point 300 that can be used in wireless network 10 in accordance with an embodiment of the present invention.

FIG. 4 presents a block diagram representation of an access point 300 that can be used in wireless network 10 in accordance with an embodiment of the present invention. In particular, access point 300, such as access point 110, 211-213, STB 214, is presented. Access point 300 includes a communication interface circuitry 308 for communicating with at least one packet switched backbone network 101. While a single connection is shown, in an embodiment of access point 300, such as access point 213 and/or STB 214, communication interface circuitry 308 provides a plurality of interfaces that communicatively couples with packet switched backbone network 101, such as the various networks shown in association with FIG. 2.

Access point 300 further includes access point transceiver circuitry 302, operatively coupled to the communication interface circuitry 308, that manages communication by transmitting at a plurality of power levels and receives data over a wireless network 10, to and from a plurality of client devices, such as client devices 121, 123, 125, 127, PCs 203 and 206, wireless phones 204 and 207, TV 205 and wireless headphones 208. Access point 300 also includes memory circuitry 306, and processing circuitry 304 that controls communication flow between the communication interface circuitry 308 and the access point transceiver circuitry 302, and that implements management application 225. Management application 225 includes power logic 227 that selects the power level of the plurality of power levels for periodic transmissions such as beacons, the transmission of data packets and the transmission acknowledgements, based on the particular target or targets that access point 300 wishes to reach with a particular transmission. In addition, management application 229 includes protocol logic 229 that selects either particular protocol parameters, or particular protocols for use in communications with one or more of the client devices. These protocols, protocol parameters, client device power levels and transmission power levels for access point 300 are stored in memory circuitry 306 and retrieved by processing circuitry 304 as needed.

The processing circuitry 304 may be a single processing device or a plurality of processing devices. Such a processing device may be, for example, any one or more of a microprocessor, microcontroller, digital signal processor, field programmable gate array, programmable logic device, logic circuitry, state machine, analog circuitry, digital circuitry, and/or any device that manipulates signals (analog and/or digital) based on operational instructions. The memory circuitry 306 may be a single memory device or a plurality of memory devices. Such a memory device may be read-only memory, random access memory, volatile memory, non-volatile memory, flash memory, static memory, dynamic memory, optical or magnetic storage, and/or any device that stores digital information. Note that when the processing circuitry 304 implements one or more of its functions via a state machine, logic circuitry, analog circuitry, and/or digital circuitry, the memory storing the corresponding operational instructions may be embedded in the circuitry comprising the state machine, logic circuit, analog circuit, and/or digital circuit.

In an embodiment of the present invention, wireless network 10 conforms to at least one industry standard communication protocol such as 802.11, 802.16, 802.15, Bluetooth, Advanced Mobile Phone Services (AMPS), Global System for Mobile Communication (GSM), and a General Packet Radio Service (GPRS). Other protocols, either standard or proprietary, may likewise be implemented within the scope of the present invention.

In operation, the management application 225 receives reception characteristics, status characteristics, mobility characteristics and utilization characteristics from at least one of the plurality of client devices. The reception characteristics includes, for example, point to point reception parameters such as the strength of signals received by at least one of the plurality of client devices from other devices over the wireless link. Based on at least some of the reception characteristics, status characteristics, mobility characteristics and utilization characteristics, the management application 225 selects transmission power levels for itself and for each of the plurality of client devices, and transmits corresponding control signals to the plurality of client devices, directing transmission power adjustment to the selected power levels. Further details, including several optional features of management application 225 are presented in association with FIG. 6.

Communication interface circuitry 308 and selected functions of AP transceiver circuitry 302 can be implemented in hardware, firmware or software. Other functions of transceiver circuitry 302 are implemented in analog RF (Radio Frequency) circuitry as will be understood by one skilled in the art when presented the disclosure herein. When implemented in software, the operational instructions used to implement the functions and features of these devices can also be implemented on processing circuitry 304 and stored in memory circuitry 306.

In operation, access point 300 communicates with each client device in a point-to-point manner. To transmit data, access point 300 generates a data packet that is formatted based the selected protocol of wireless network 10. In particular, communication interface circuitry 308 produces data payloads based on data received from packet switched backbone network 101. Other control information and data including the selected power levels and protocol parameters destined for the client devices of wireless network 10 are derived from power the management application 225 of the processing circuitry 304.

AP transceiver circuitry 302 modulates the data, up-converts the modulated data to produce an RF signal of the wireless network 10. In an embodiment of the present invention, the AP transceiver circuitry 302 transmits at one of a plurality of power levels, as determined by management application 225. As one of average skill in the art will appreciate, if the access point 300 operates based on a carrier sense multiple access with collision avoidance (CSMA/CA), when access point 300 transmits data, each client device in communication with wireless network 10 may receive the RF signal, but only the client that is addressed, i.e., a target client device, will process the RF signal to recapture the packet.

AP transceiver circuitry 302 is further operable to receive signals from the plurality of client devices over wireless network 10. In this instance, transceiver circuitry 302 receives an RF signal, down-converts the RF signal to a base-band signal and demodulates the base-band signal to recapture a packet of data. In particular, data payloads destined for packet switched backbone network 101 are provided to communication interface circuitry 308 to be formatted in accordance with the protocol used by packet switched backbone network 101. Other control information and data including the selected reception characteristics received from the client devices of wireless network 10 are provided to management application 225 of processing circuitry 304.

Figure 5:
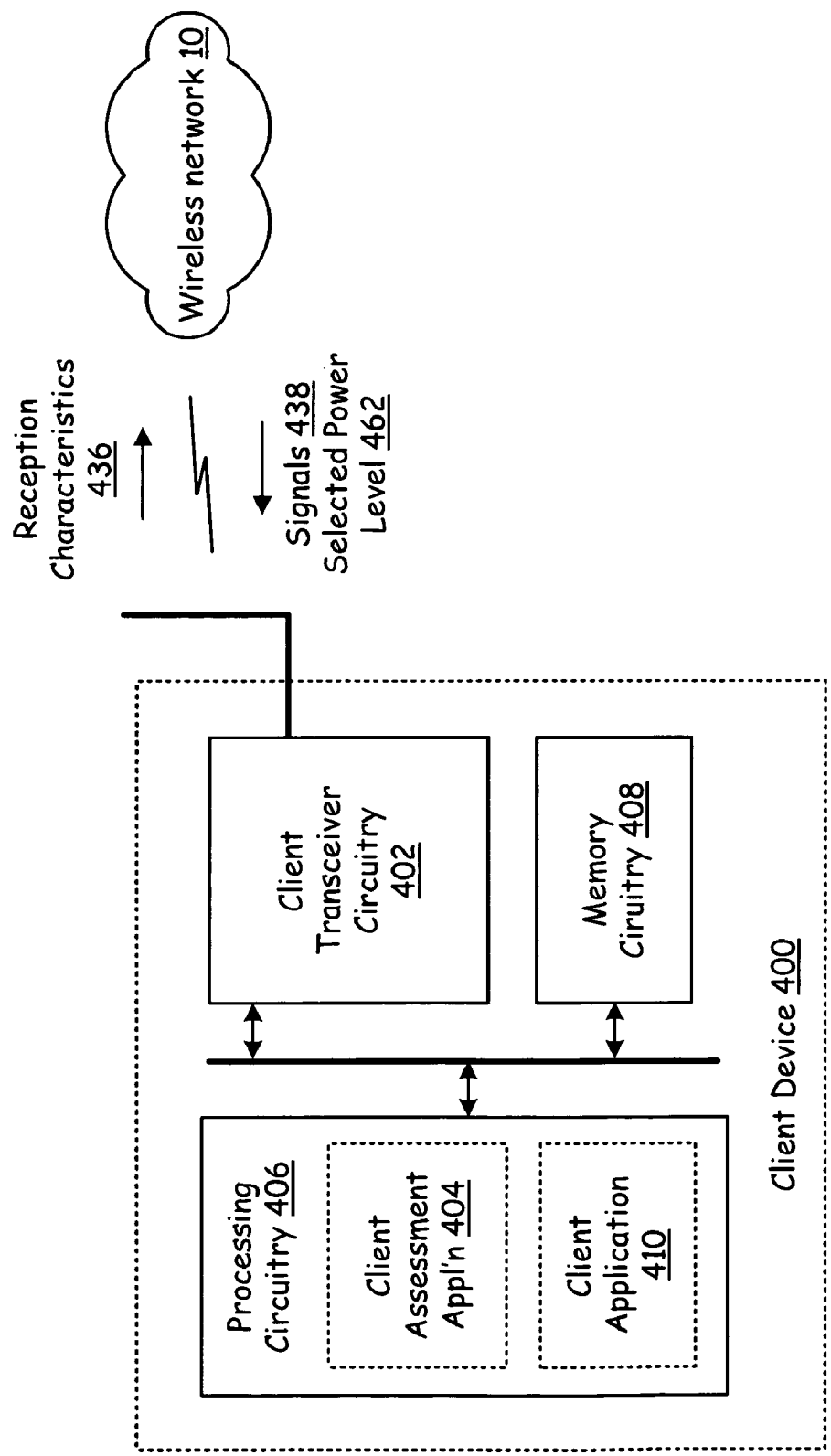
FIG. 5 presents a block diagram representation of a client device 400 that can be used in wireless network 10 in accordance with an embodiment of the present invention.

FIG. 5 presents a block diagram representation of a client device 400 that can be used in wireless network 10 in accordance with an embodiment of the present invention. A client device 400 is presented, such as client devices 121, 123, 125, 127, PCs 203 and 206, wireless phones 204 and 207, TV 205 and wireless headphones 208. In particular, client device 400 includes a client transceiver circuitry 402 that transmits and receives data over wireless network 10, that operates in a similar fashion to access point transceiver circuitry 402. However, client transceiver circuitry 402 is operable to transmit at a selected power level, received from access point 300.

Client device 400 includes memory circuitry 408, and processing circuitry 406 that implements client assessment application 404 and client application 410. The processing circuitry 406 may be a single processing device or a plurality of processing devices. Such a processing device may be a microprocessor, microcontroller, digital signal processor, field programmable gate array, programmable logic device, logic circuitry, state machine, analog circuitry, digital circuitry, and/or any device that manipulates signals (analog and/or digital) based on operational instructions. The memory circuitry 408 may be a single memory device or a plurality of memory devices. Such a memory device may be read-only memory, random access memory, volatile memory, non-volatile memory, flash memory, static memory, dynamic memory, and/or any device that stores digital information. Note that when the processing circuitry 406 implements one or more of its functions via a state machine, logic circuitry, analog circuitry, and/or digital circuitry, the memory storing the corresponding operational instruction will be embedded in the circuitry comprising the state machine, logic circuit, analog circuit, and/or digital circuit.

Further, client device 400 includes a client assessment application 404, operably coupled to the client transceiver circuitry 402, that assesses signals received from other devices, including the access point and other client devices, over the wireless network 10. In response, client assessment application 404 generates reception characteristics and transmits the reception characteristics over the wireless link to access point 300.

In operation, the client assessment application 404 includes operational instructions that cause processing circuitry 406 to transfer data and signals to and from client transceiver circuitry 402; to assess signals 438 received from other devices, including other client devices, over the wireless link; and to generate reception characteristics 436. In one mode of operation, client assessment application calculates a measure of signal strength, such as RSSI for each of the other devices and formats this information as reception characteristics 436 for transmission to management application 225. Further details, including several optional features of client assessment application 404 are presented in association with FIG. 5.

Client application 410 includes the prime functions of the device itself, (e.g. a television, telephones, personal computer, headphones, etc.) Selected data packets transmitted to and wide area network originate 101 from data received from client application 410. In addition, data packets received from packet switched backbone network 101 are passed to client application 410.

Selected functions of client transceiver circuitry 402 can be implemented in hardware, firmware or software. Other functions of client transceiver circuitry 402 are implemented in analog RF circuitry as will be understood by one skilled in the art when presented the disclosure herein. When implemented in software, the operation instructions used to implement the functions and features of these devices can be implemented on processing circuitry 406 and stored in memory circuitry 408.

In an embodiment of the present invention, one or more components of client transceiver circuitry 402, processing circuitry 406 and memory circuitry 408 are implemented on an integrated circuit.

Figure 6:
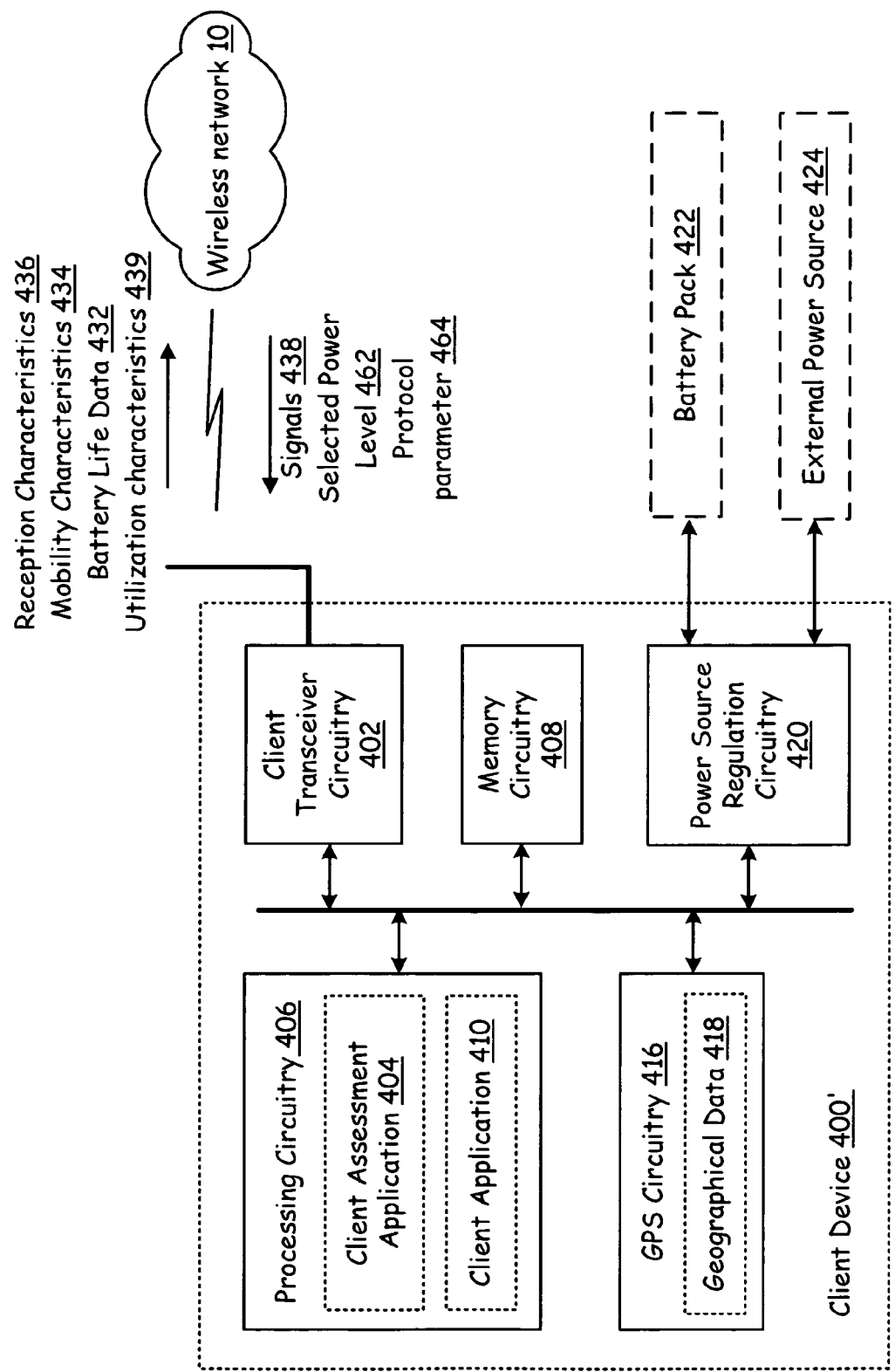
FIG. 6 presents a block diagram representation of a client device 400' with optional GPS circuitry 416 and power source regulation circuitry 420 in accordance with an embodiment of the present invention.

FIG. 6 presents a block diagram representation of a client device 400 ' with optional GPS circuitry 416 and power source regulation circuitry 420 in accordance with an embodiment of the present invention. Client device 400' can be used in place of client device 400 in any of the applications disclosed herein. In particular, a client assessment application 404 includes operational instructions that cause processing circuitry 406 to support the management application 225 of the access point 300. In particular, the client assessment application 404 is operably coupled to power source regulation circuitry 420 to monitor the charging of optional battery pack 422, monitor the charge used by battery pack 422, to determine the remaining charge on battery pack 422 and whether the optional external power source 424 is currently connected.

The client assessment application 404 includes operational instructions that cause processing circuitry 406 to generate battery life data 432 and transmit such status characteristics over the wireless network 10 via client transceiver circuitry 402. In one mode of operation, client assessment application 404 generates and transmits further status characteristics such as estimated remaining battery life. For instance, battery life data 432 can indicate the client device 400 ' is coupled to external power source 424, an estimated battery life for one or more selected power levels, an estimated battery life for one or more coding schemes, an estimated battery life battery life for one or more possible data rates, an estimated battery life based on an estimated channel usage, an estimated battery life battery life based on an estimate of required deterministic bandwidth, and an estimated battery life based on an estimate of non-deterministic bandwidth, or other estimates of battery life based on further operational parameters of client device 400'. Also as mentioned previously, other types of status characteristics can be generated pursuant to the client assessment application 404 and communicated to the management application running on the access point device 110.

Utilization characteristics can be similarly collected and communicated. For example, utilization characteristics may be retrieved directly from the current client application(s) or from the memory 408. Utilization characteristics retrieved from the memory may have originated, for example, based on: 1) prior interaction with or monitoring of the client application 410; 2) user input; and 3) preset values.

The client assessment application 404 also causes the processing circuitry 406 to generate and transmit mobility characteristics 434 over the wireless link 434 via the client transceiver circuitry 402. GPS module 416 provides geographical data 418 such as GPS coordinates, scalar and/or vector velocities, accelerations, etc. In addition to such geographical coordinate data 418, mobility module can generate mobility characteristics 434 that includes a mobility factor indicative of whether the client device is in a stationary condition, the client device is in a low mobility condition such as a laptop computer that shifts slightly on a table in a coffee shop, or whether the client device is in a high mobility condition, such as in a car or other mobile environment. This additional mobility characteristics 434 can be associated with a type of a device, e.g. a laptop computer may have a low mobility rating, a wireless transceiver circuitry mounted in a vehicle may have a medium mobility rating, a desktop computer may have a stationary mobility rating, etc. Further the mobility factor can be user selected based on the particular conditions. In addition, the mobility factor can be derived based on assessing a scalar or vector velocity from GPS module 416 and/or changes in geographical coordinate data 418 over time, and comparing the velocity to one of a plurality of mobility thresholds.

When generated and transmitted to management application 225, battery life data 432, utilization characteristics 439, mobility characteristics 434, and other status characteristics can further be used by management application 225 for determining a selected power level for client device 400', for access point 300, and for other client devices of wireless network 10, and for determining either a particular protocol or protocol parameters used by client device 400' in communications with access point 300. When received, selected power level 462 and protocol parameter 464 can be used to generate the transmissions by client device 400' to access point 300.

Figure 7:
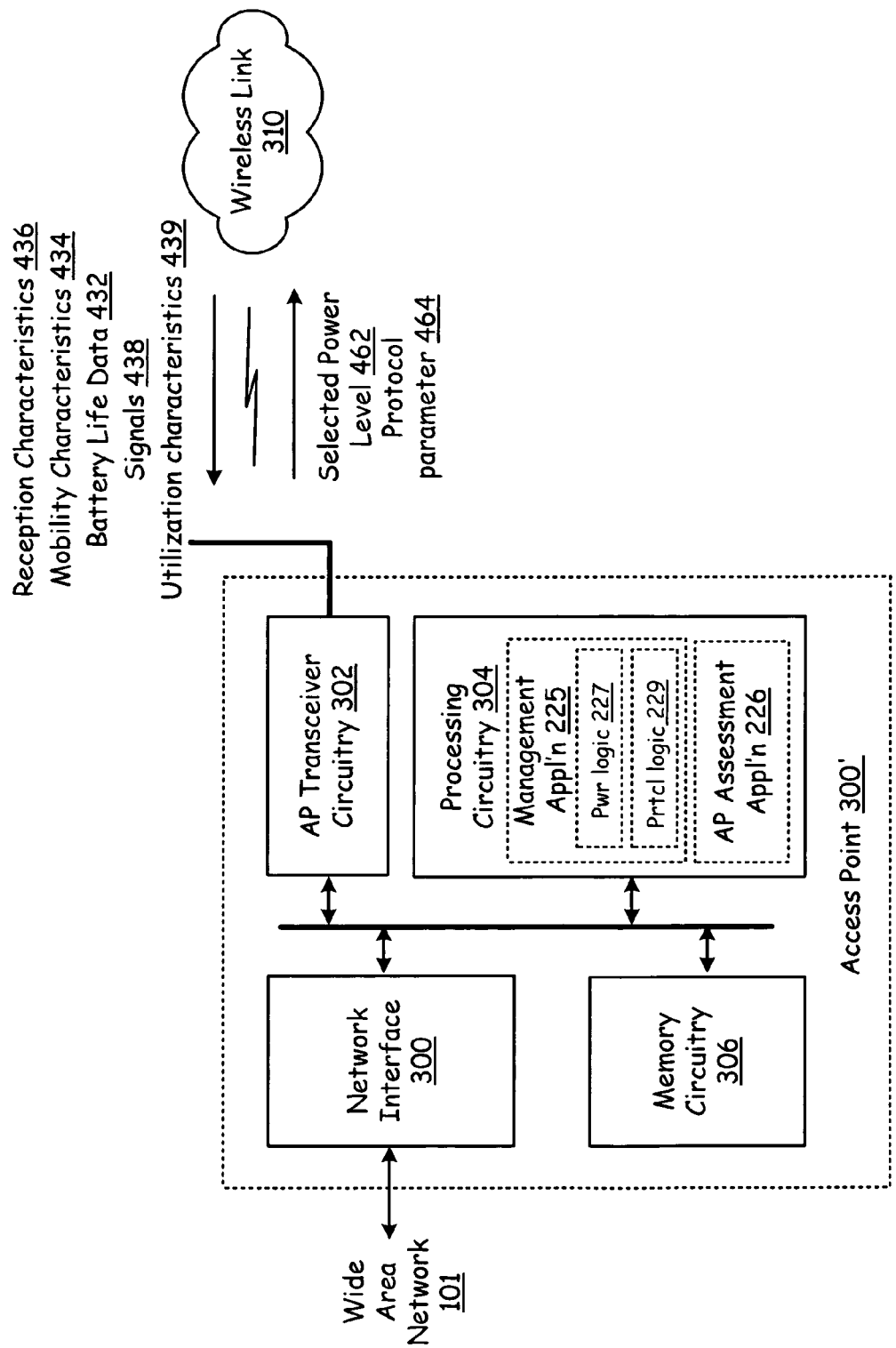
FIG. 7 presents a block diagram representation of an access point 300' with optional AP assessment application 225 in accordance with an embodiment of the present invention.

FIG. 7 presents a block diagram representation of an access point 300' with optional AP assessment application 225 in accordance with an embodiment of the present invention. An access point 300' is presented that includes many common elements of access point 300, referred to by common reference numerals. In addition, the access point 300' includes an AP assessment application 226 that includes operational instructions, that cause the processing circuitry 304 to assess signals 438 received from the plurality of client devices, such as client device 400, over the wireless network 10. The assessed strength of signals 438 can also be used by management application 225 to determine the selected power level the plurality of client devices of wireless network 10. Access point 300' may be used in any of the applications discussed in conjunction with access point 300.

In particular, access point assessment application 226 assesses signals 438 received from the plurality of client devices based upon a signal strength criteria such as RSSI, a signal to noise ratio (SNR), a noise parameter, or an amount of bit errors, and a bit error rate (BER) of data received from the particular client device.

In a test mode of operation, the access point assessment application 226 is operable to generate a test packet such as an echo packet that is transmitted to the client device where a reply packet is transmitted and received back by access point 300. The number of bit errors or the BER for this particular packet can be calculated by comparing the received data to the data that was transmitted. All other client devices that do not participate in the exchange, listen and generate reception characteristics for the access point assessment application 226.

In a further "sniffing" mode of operation, the access point assessment application 226 receives reception characteristics generated by the various client devices based on normal, ongoing packets exchanges with the access point. For example, reception characteristics might comprise an error detecting code such as a linear block code, convolutional code or error correcting code can be used to determine the number of bit errors in the received data, within the coding limit of the particular code use. For instance, a (24,12) Golay code with optional CRC bit could detect up to 4 errors in a 24 bit coded word before the coding limit was reached.

The management application 225 assesses the received reception characteristics 436, mobility characteristics 434, utilization characteristics 439 and battery life data 432. Optional assessed strength of signals are received from access point assessment application 226. Although not shown, other types of status characteristics and are also received and assessed by the management application 225.

The management application 225 implements a plurality of power management rules, based on the reception characteristics 436 (including the assessed strength of signals), the mobility characteristics 434, utilization characteristics, battery life data 432 and other status characteristics. The power management rules generate a selected power level to be used by the access point 300 and a selected power level 462 to be used by one, all or a group of ones of a plurality of client devices, such as client device 400. Upon receiving a corresponding control instruction from the management application 225, any such client device responds adjusting the transmission power to that selected.

In operation, the access point 300', through transceiver circuitry 302, is capable of transmitting at a selected power level that is based on factors such as the type of transmission, the reception characteristics, status characteristics, utilization characteristics, mobility characteristics, and the particular target device for the transmission. For instance, access point 300' can transmit periodic beacons at a high power level that include information such as a service set identifier (SSID) and network name. These beacons are used to support new associations with client devices that enter the proximity of access point 300' or that otherwise become active within this proximity. Reception characteristics relating to how well client devices, such as the client devices 121, 123, 125, 127, 400 and 400', receive these beacon transmissions can be generated by the client assessment application 404 of these client devices and transmitted back to the access point. In response, management application 225 determines a customized power level for the access point to transmit to each client device that can be reduced from the maximum power output, but that provides sufficient power to be received by that particular client device. In addition, management application 225 determines an intermediate power level that is sufficient to be received by all of the client devices that are currently associated with access point 300'. Specific packets, such as all acknowledgements (ACKs), every other ACK, every nth ACK etc., all data packets, occasional data packets, etc. are transmitted by the access point 300' at the intermediate power level that will reach all of the associated client devices, with the remaining packets transmitted at the power level that is customized for the particular client device 121, 123, 125, 127, 400 or 400' to which the packets are addressed.

By way of further example, the power level generation module can, through operation of the power management rules, determine which of the client devices 400 are not being heard by other client devices. In response, power level generation module can establish a selected power level 462 for such client devices 400 to optionally boost the transmission power so that they will be heard by some or all of the remaining client devices. In addition, power level generation module can reduce the power generated by a client device 400 that is generating a stronger than necessary signal for being heard by the remaining client devices.

Management application 225 is further operable to manage the protocol or protocols used in communicating between the access point 300' and the client devices associated with access point 300' over wireless network 10. In one mode of operation, management application 225 can selectively adjust one or more protocol parameters, such as the packet length, data rate, forward error correction, error detection, coding scheme, data payload length, contention period, and back-off parameters used by access point 300' in communication with one or more of the client devices 121, 123, 125, 127, 400 and/or 400' based on the analysis of the reception characteristics, status characteristics, utilization characteristics, and mobility characteristics. In this fashion, the protocol parameters can optionally be adapted based on the conditions of the network, including not only the mobility, utilization, status, and reception characteristics of a particular device, but the mobility, utilization, status, and reception characteristics of a plurality of other devices, including how well each client device receives other client devices.

For example, in the event that a first client device has difficulty detecting transmissions from a second client device, access point 300' can modify the protocol parameters so that transmissions by the second client device include more aggressive error correcting codes, increased back-off times and/or smaller data payloads or packet length to increase the chances that a packet will be received in the event of contention by the first client device. In addition, decreasing the packet length can increase the frequency of acknowledgements transmitted by access point 300'. These acknowledgements can be transmitted at a power level sufficient to be heard by the first client device. With increased back-off times, first client device is less likely to create a potential contention.

In a further mode of operation, access point 300' and its associated client devices can operate using a plurality of different, and potentially complimentary, protocols having different protocol parameters. Access point 300' can likewise select a particular one of a plurality of protocols that suits the particular conditions present in the wireless network 10, as determined based on an assessment of utilization characteristics, status characteristics, mobility characteristics and/or reception characteristics. For instance, an access point can select from 802.11(n), 802.11(g) or 802.11(b) protocols having different protocol parameters, data rates, etc, based on the particular protocol best suited to accommodate the characteristics of the client devices that are present.

In an embodiment of the present invention, one or more components of communication interface circuitry 308, access point transceiver circuitry 302, memory circuitry 306 and processing circuitry 304 are implemented on an integrated circuit.

Figure 8:
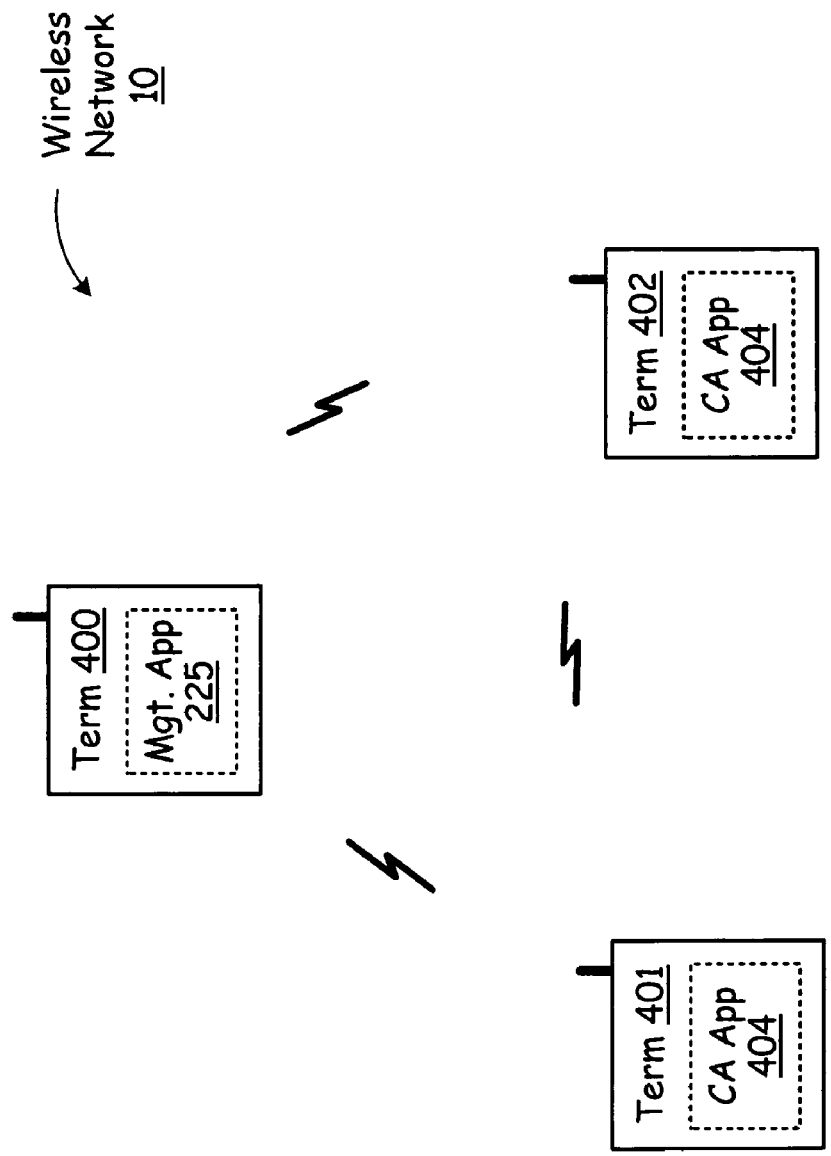
FIG. 8 presents a pictorial representation of a wireless network 10 in accordance with an embodiment of the present invention that provides a management application 225 in one of a plurality of terminals.

FIG. 8 presents a pictorial representation of a wireless network 10 in accordance with an embodiment of the present invention that provides a management application 225 in one of a plurality of terminals. A wireless network 10 includes terminals 400, 401 and 402 that are each capable of sending and receiving data from the other terminals over a wireless link.

Terminal 400 includes a management application 225 and terminals 400 and 402 include a client assessment application 404 that allows the selection of transmit power levels to promote effective communication, while reducing the power consumption of terminals. Each of the terminals 400, 401 and 402 are operable to assess the signals received from other devices over the wireless link. Terminals 401 and 402 generate data such as reception characteristics based on the assessed signals, battery life data based on estimates of power consumption, and other status, utilization and mobility characteristics based indicating how likely the signal strengths for a particular terminal may change due to movement, how it is being used and its other anticipated current, estimated or anticipated conditions.

Terminals 401 and 402 transmit these data over the wireless link to terminal 400. Terminal 400, determines a selected power level and particular protocols or protocol parameters for itself and for each other terminal, based on the data that it receives for each device, and transmits the selected power levels and protocol parameter(s) back to each corresponding device. The terminals 401 and 402 can then transmit at a power level and with a protocol that takes advantage of their particular circumstances, including their status in the overall wireless network 10, and based on the positions and properties of the other terminals that are present.

In operation, terminal 400, while not performing the specific functions of an access point, is capable of performing other features and functions of either access point 300 or access point 300' discussed herein. In addition, terminals 401, while not necessarily performing the functions of a client application, are capable of performing other features and functions of either client device 400 or client device 400 ' discussed herein.

In another mode, all parameters are exchanged between every wireless terminal and the access point so that each can independently or cooperatively make transmission power control decisions.

For instance, a communication network such as wireless network 10 can include a first device such as terminal 400, having a first wireless transceiver that transmits at a plurality of power levels, a second device, such as terminal 401 having a second wireless transceiver, and a third device, such as terminal 402 having a third wireless transceiver. The second device generates a first reception characteristic based on at least one transmission from the third wireless transceiver, and the second device transmits the first reception characteristic to the first wireless transceiver of the first device. The third device generates a second reception characteristic based on at least one transmission from the second wireless transceiver, and the third device transmits the second reception characteristic to the first wireless transceiver of the first device. The transmission from the third wireless transceiver can comprises either a portion of an ongoing data exchange or a portion of a test message.

The first device, based on the first reception characteristic, selects a first power level of the plurality of power levels for transmissions by the first transceiver circuitry to the third transceiver circuitry. The first device, based on the second reception characteristic, selects a second power level of the plurality of power levels for transmissions by the first transceiver circuitry to the second transceiver circuitry, and the first power level is greater than the second power level.

In another mode of operation, the first device is further operable to select a first protocol parameter for transmissions by the first wireless transceiver to the second device. The first device is further operable to select a second protocol parameter for transmissions by the first wireless transceiver to the third device. This allows the protocols as well as the power levels to be adapted to the particular conditions present in wireless network 10.

In a further mode, the first and second devices transmit mobility characteristics, status characteristics, and utilization characteristics to the first device. The first device assesses at least a portion of the mobility, status and utilization characteristics along with the reception characteristic to generate the power levels for itself and for the second and third devices and for the protocol parameters used by these devices to format transmissions that are sent and to decode transmissions that are received.

Figure 9:
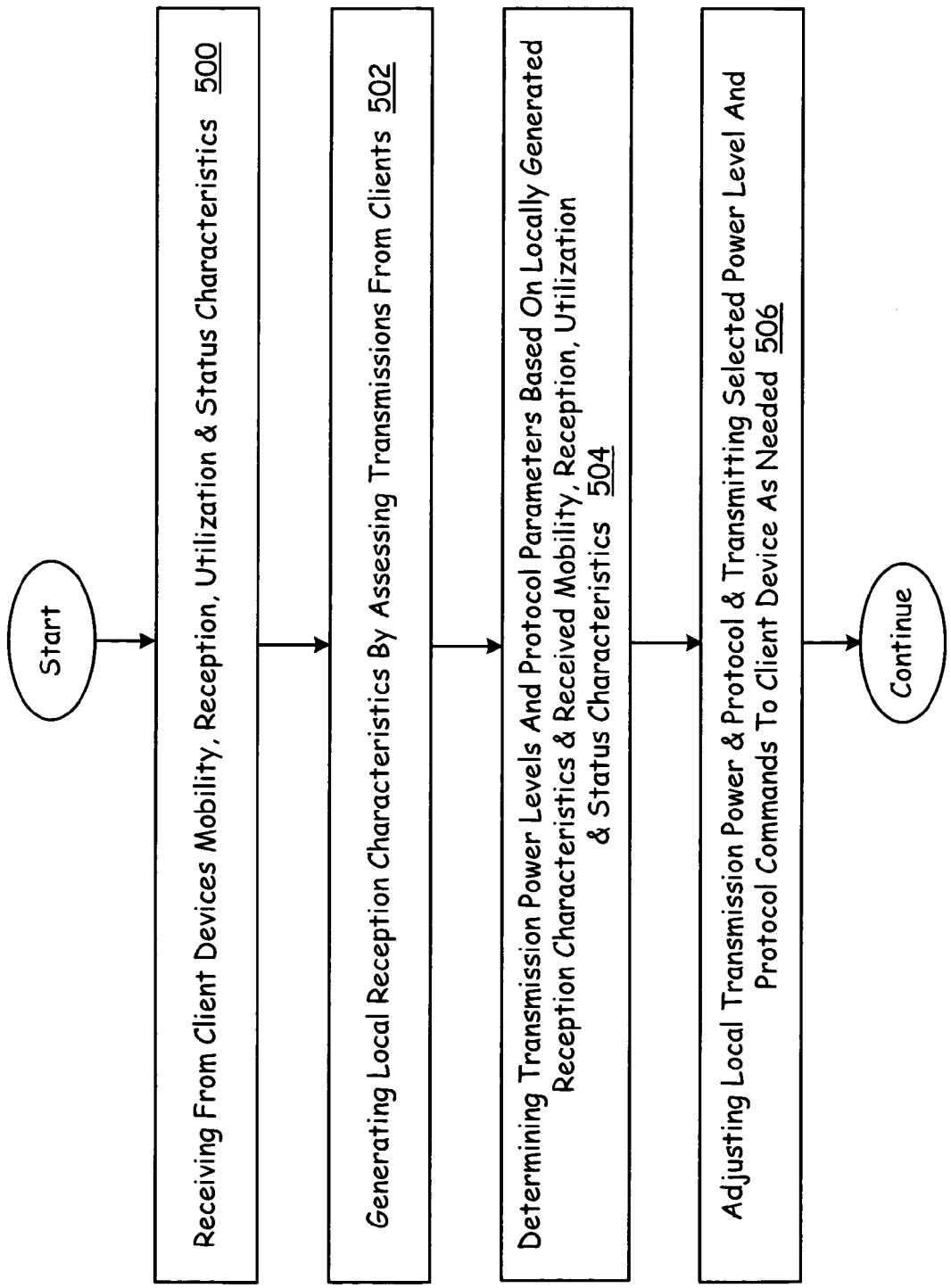
FIG. 9 presents a flowchart representation of a method that can be used in a terminal, access point and/or an integrated circuit in accordance with an embodiment of the present invention.

FIG. 9 presents a flowchart representation of a method that can be used in a terminal, access point and/or an integrated circuit in accordance with an embodiment of the present invention. In particular, a method is presented for use in conjunction with one or more features and functions presented in association with FIGS. 1-8. In step 500, reception characteristics, mobility characteristics, utilization characteristics, and status characteristics are received from one or more client devices over a wireless link. In step 502, the signals received from one or more client devices over the wireless link are assessed and local reception characteristics is generated. Such signals are either test signals or part of ongoing communication exchanges. In step 504, transmission power levels and protocol parameters are determined for each of the client devices and for local use based on any part or all of the locally generated reception characteristics and the received mobility, reception, utilization, and status characteristics. In step 506, the local transmission power and protocol is adjusted, if needed, and commands requesting transmission power and protocol adjustments are sent to each of the client devices as needed. This method is well suited for being implemented as operational instructions that are stored in a memory such as memory circuitry 306 and implemented using processing circuitry such as processing circuitry 304.

For example, the status characteristics related to battery life might indicate one or more of the following: whether the client device is coupled to an external power source; the battery life for at least one selected power level; the battery life for at least one coding scheme; the battery life for at least one data rate; the battery life based on an estimated channel usage; the battery life based on an estimate of required deterministic bandwidth; and the battery life based on an estimate of non-deterministic bandwidth. The mobility characteristics might indicate, for example, one or more of the following: the client device is in a stationary condition; the client device is in a low mobility condition; the client device is in a high mobility condition; and a geographical coordinate of the client device.

The reception characteristics such as the assessment signal strength might include, for example, one or more of: a received signal strength indicator (RSSI); a signal to noise ratio; a noise parameter; an amount of bit errors; and a bit error rate (BER). In one mode of operation, a test packet such as an echo packet is transmitted to the client device where a reply packet is transmitted and received back. The number of bit errors or the BER for this particular packet can be calculated by comparing the received data to the data that was transmitted.

In further mode of operation, received data is assessed based on the payload of normal packets that are received. For instance, an error detecting code such as a linear block code, convolutional code or error correcting code can be used to determine the number of bit errors in the received data, within the coding limit of the particular code use. For instance, a (24,12) Golay code with optional CRC bit could detect up to 4errors in a 24 bit coded word before the coding limit was reached.

In one mode of operation, step 504 implements a plurality of power management rules, based on the reception characteristics, and optionally the mobility characteristics, battery life data and the assessed strength of signals. These power management rules generate a selected power level for an access point based on factors such as the type of transmission, the reception characteristics, status characteristics, utilization characteristics, mobility characteristics, and the particular target device for the transmission. For example, the access point can transmit periodic beacons at a high power level that include information such as a service set identifier (SSID) and network name. These beacons are used to support new associations with client devices that enter the proximity of the access point or that otherwise become active within this proximity. Reception characteristics relating to how well the client devices receive these beacon transmissions can be generated by the client devices and transmitted back to the access point. In response, the access point determines a customized power level for transmissions to each client device that can be reduced from the maximum power output, but that provides sufficient power to be received by that particular client device. In addition, the access point determines an intermediate power level that is sufficient to be received by all of the client devices that are currently associated with access point. Specific packets, such as all acknowledgements (ACKs), every other ACK, every nth ACK etc., all data packets, occasional data packets, etc. are transmitted by the access point at the intermediate power level that will reach all of the associated client devices, with the remaining packets transmitted at the power level that is customized for the particular client device to which the packets are addressed.

In a further mode of operation, these power management rules establish a selected power level for a plurality of client devices, that are equipped to receive the selected power level and to set the selected power level accordingly. The selected power levels are transmitted to the corresponding client devices. The selected power level for each client device can be a discrete variable that takes on one of a finite number of values. For example, through operation of the power management rules, the method can determine which of the client devices are not being heard by other client devices. In response, a selected power level can be established for such client devices to optionally boost the transmission power so that they will be heard by some or all of the remaining client devices. In addition, power management rules can reduce the power generated by a client device that is generating a stronger than necessary signal for being heard by the remaining client devices.

In a further example, an analysis of reception characteristics and battery life data may reveal that a client device is easily detected by each of the other devices and that it is running low on battery power. In response, a reduced power level can be selected for that device to extend its battery life.

In another example, an analysis of reception characteristics and mobility characteristics may reveal that a client device is highly mobile. Rather than relying solely on reception characteristics, the power management rules select a power level for an access point or client device that takes into consideration the client device's possible movement.

In addition, the protocol or protocols used in communicating between devices of the wireless network are adapted to the particular characteristics of the access point and the client devices. In one mode of operation, the method can selectively adjust one or more protocol parameters, such as the packet length, data rate, forward error correction, error detection, coding scheme, data payload length, contention period, and back-off parameters used in communication between devices, based on the analysis of information, such as the reception characteristics, status characteristics, utilization characteristics, and mobility characteristics of these devices. In this fashion, the protocol parameters can optionally be adapted based on the conditions of the network, including not only the mobility, utilization, status, and reception characteristics of a particular device, but the mobility, utilization, status, and reception characteristics of a plurality of devices, including how well each device receives transmissions from other devices.

In this fashion, the method can include selecting a first power level of the plurality of power levels for periodic transmissions by an access point; receiving a first plurality of characteristics relating to an evaluation by a first client device of transmissions received by the first client device from both the access point and a second client device; receiving a second plurality of characteristics relating to an evaluation by the second client device of transmissions received by the second client device from both the access point and the first client device; and assessing both the first plurality of characteristics and the second plurality of characteristics and, based on the assessment, selecting both a second power level of the plurality of power levels for transmissions by the access point to the first client device and a third power level of the plurality of power levels for transmissions by the access point to the second client device, and the first power level is greater that the second power level, while the second power level is greater than the third power level.

Figure 10:
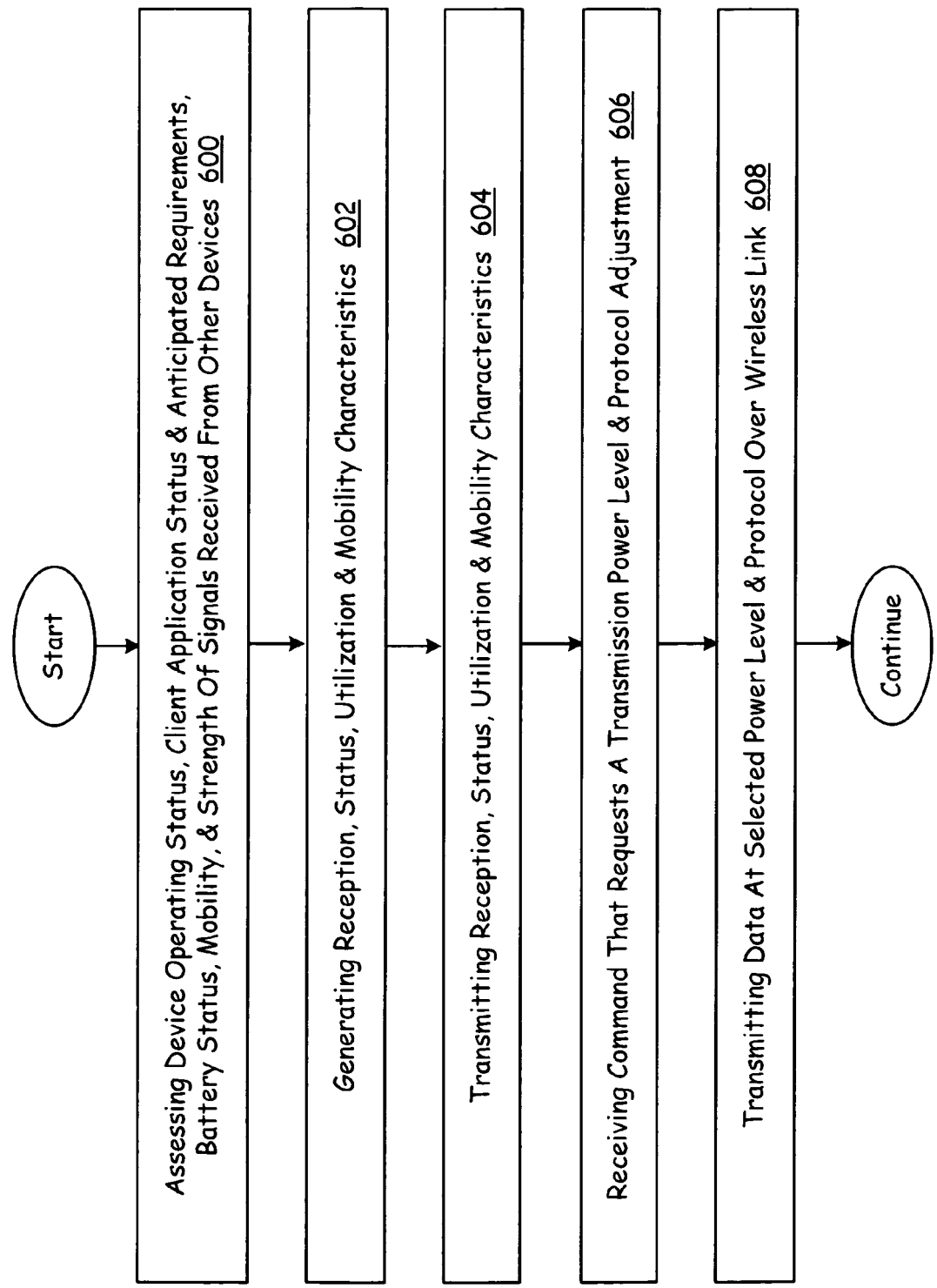
FIG. 10 presents a flowchart representation of a method that can be used in a terminal, client device and/or an integrated circuit in accordance with an embodiment of the present invention.

FIG. 10 presents a flowchart representation of a method that can be used in a terminal, client device and/or an integrated circuit in accordance with an embodiment of the present invention. In particular, a method is presented for use in conjunction with one or more features and functions presented in association with FIGS. 1-9. In step 600, signals received from other devices over a wireless link by a client device are gathered and assessed along with battery status, device operating status, client application status and anticipated communication requirements and mobility information. In step 602, based on such gathering and assessment, reception, status, utilization and mobility characteristics are generated. In step 604, such generated characteristics are transmitted over the wireless link. In step 606, in response to the transmission in step 604, a command requesting a transmission power level and protocol adjustment is received over the wireless link. In step 608, data is transmitted over the wireless link in accordance with the request at the selected power level and protocol. This method is well suited for being implemented as operational instructions that are stored in a memory such as memory circuitry 408 and implemented using processing circuitry such as processing circuitry 406.

For example, the status characteristics such as battery life data can indicate one or more of the following: whether a device such as a client device is coupled to an external power source, the battery life for at least one selected power level, the battery life for at least one coding scheme, the battery life for at least one data rate, the battery life based on an estimated channel usage, the battery life based on an estimate of required deterministic bandwidth, and the battery life based on an estimate of non-deterministic bandwidth. The mobility characteristics can indicates one or more of the following: the client device is in a stationary condition, the client device is in a low mobility condition, the client device is in a high mobility condition, and a geographical coordinate of the client device.

The assessment signal strength can include one or more of: a received signal strength indicator (RSSI), a signal to noise ratio, a noise parameter, an amount of bit errors, and a bit error rate (BER). In one mode of operation, a test packet such as an echo packet is transmitted to the client device where a reply packet is transmitted and received back. The number of bit errors or the BER for this particular packet can be calculated by comparing the received data to the data that was transmitted.

In further mode of operation, received data is assessed based on the payload of normal packets that are received. For instance, an error detecting code such as a linear block code, convolutional code or error correcting code can be used to determine the number of bit errors in the received data, within the coding limit of the particular code use. For instance, a (24,12) Golay code with optional CRC bit could detect up to 4 errors in a 24 bit coded word before the coding limit was reached.

In one mode of operation, a device, such as a client device, terminal or access point, implements a plurality power management rules, based on the reception characteristics, and optionally the mobility characteristics, battery life data and the assessed strength of signals. These power management rules generate a selected power level for the host terminal, access point of client device and for a plurality of client devices, that are equipped to receive a selected power level and to set the selected power level accordingly. The selected power levels are transmitted to the corresponding client devices. The selected power level for each client device can be a discrete variable that takes on one of a finite number of values.

For example, through operation of the power management rules, the method can determine which of the client devices are not being heard by other client devices. In response, a selected power level can be established for such client devices to optionally boost the transmission power so that they will be heard by some or all of the remaining client devices. In addition, power management rules can reduce the power generated by a client device that is generating a stronger than necessary signal for being heard by the remaining client devices.

In a further example, an analysis of reception characteristics and battery life data may reveal that a client device is easily detected by each of the other devices and that it is running low on battery power. In response, a reduced power level can be selected for that device to extend its battery life, with or without one or both of: a) switching the low power device to another protocol or otherwise adapting its current protocol in accommodation; and b) switching all other devices to another protocol or otherwise adapting their current protocol in accommodation In another example, an analysis of reception characteristics and mobility characteristics may reveal that a client device is highly mobile. Rather than relying solely on reception characteristics, the power management rules select a power level for this client device that takes into consideration its possible movement.

In this fashion, the present invention can include a the method for use in a first client device that, along with at least a second client device, wirelessly communicates with and a packet switched backbone network via an access point. Periodic transmissions by the access point at first power level of the plurality of power levels are received. Transmissions received from both the access point and the second client device are evaluated and a first plurality of characteristics relating to the evaluation by the first client device are transmitted to the access point. A transmission is received from the access point at a second power level of the plurality of power levels that is based on an assessment of both the first plurality of characteristics and a second plurality of characteristics from the second client device, wherein the first power level is greater that the second power level, and the transmission contains a selected power level and one or more protocol parameters for transmissions by the first client device. In response the client device transmits at the selected power level and in accordance with the protocol parameter(s).

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.35 micron or smaller CMOS technology. Provided however that other circuit technologies including other transistor, diode and resistive logic, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a wireless network, access point, client device, integrated circuit. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A wireless network communicatively coupled to a packet switched backbone network, the wireless network comprising:
    an access point having communication interface circuitry that communicatively couples with the packet switched backbone network, access point processing circuitry, and access point transceiver circuitry that manages communication by transmitting at a plurality of power levels;
    the access point processing circuitry controls communication flow between the communication interface circuitry and the access point transceiver circuitry, the access point processing circuitry selects a first power level of the plurality of power levels for periodic transmissions by the access point transceiver circuitry;
    a first client device having first client processing circuitry and first client transceiver circuitry;
    a second client device having second client processing circuitry and second client transceiver circuitry;
    the first client transceiver circuitry and the second client transceiver circuitry both communicatively coupling with the packet switched backbone network via the access point transceiver circuitry, the access point processing circuitry, and the communication interface circuitry;
    the first client processing circuitry evaluates transmissions from both the access point transceiver circuitry and the second client transceiver circuitry, and transmits to the access point transceiver via the first client transceiver circuitry a first plurality of characteristics relating to the evaluation by the first client processing circuitry;
    the second client processing circuitry evaluates transmissions from both the access point transceiver circuitry and the first client transceiver circuitry, and transmits to the access point transceiver via the second client transceiver circuitry a second plurality of characteristics relating to the evaluation by the second client processing circuitry; and
    the access point processing circuitry assesses both the first plurality of characteristics and the second plurality of characteristics and, based on the assessment, selects both a second power level of the plurality of power levels for transmissions by the access point transceiver circuitry to the first client transceiver and a third power level of the plurality of power levels for transmissions by the access point transceiver circuitry to the second client transceiver, and the first power level is greater that the second power level, while the second power level is greater than the third power level.

2. The wireless network of claim 1, wherein the transmissions evaluated by the first client processing circuitry comprise at least a portion of an ongoing data exchange.

3. The wireless network of claim 1, wherein the transmissions evaluated by the first client processing circuitry comprise at least one test signal exchange.

4. The wireless network of claim 1, wherein the first plurality of characteristics further include mobility characteristics of the first client device.

5. The wireless network of claim 1, wherein the first plurality of characteristics further include utilization characteristics of the first client device.

6. The wireless network of claim 1, wherein the first plurality of characteristics further include status characteristics of the first client device.

7. The wireless network of claim 1, wherein the access point processing circuitry is further operable to select a first protocol parameter for transmissions by the access point transceiver circuitry to the first client transceiver.

8. A method for use in an access point that wirelessly couples a first client device and a second client device to a packet switched backbone network, the method comprising:
    selecting a first power level of the plurality of power levels for periodic transmissions by the access point;
    receiving a first plurality of characteristics relating to an evaluation by the first client device of transmissions received by the first client device from both the access point and the second client device;
    receiving a second plurality of characteristics relating to an evaluation by the second client device of transmissions received by the second client device from both the access point and the first client device; and
    assessing both the first plurality of characteristics and the second plurality of characteristics and, based on the assessment, selecting both a second power level of the plurality of power levels for transmissions by the access point to the first client device and a third power level of the plurality of power levels for transmissions by the access point to the second client device, and the first power level is greater that the second power level, while the second power level is greater than the third power level.

9. The method of claim 8, wherein the transmissions evaluated by the first client device comprise at least a portion of an ongoing data exchange.

10. The method of claim 8, wherein the transmissions evaluated by the first client device comprise at least one test signal exchange.

11. The method of claim 8, wherein the first plurality of characteristics include mobility characteristics.

12. The method of claim 8, wherein the first plurality of characteristics include utilization characteristics.

13. The method of claim 8, wherein the first plurality of characteristics include status characteristics.

14. The method of claim 8, wherein the step of assessing both the first plurality of characteristics and the second plurality of characteristics further includes selecting a first protocol parameter for transmissions by the access point transceiver circuitry to the first client transceiver.

15. A method for use in a first client device that, along with at least a second client device, wirelessly communicates with and a packet switched backbone network via an access point, the method comprising:
  receiving periodic transmissions by the access point at first power level of the plurality of power levels;
  evaluating transmissions received from both the access point and the second client device and transmitting to the access point a first plurality of characteristics relating to the evaluation by the first client device;
  receiving a transmission from the access point at a second power level of the plurality of power levels that is based on an assessment of both the first plurality of characteristics and a second plurality of characteristics from the second client device, the first power level is greater that the second power level, and the transmission contains a selected power level for transmissions by the first client device; and
  transmitting at the selected power level.

16. The method of claim 15, wherein the transmissions evaluated by the first client device comprise at least a portion of an ongoing data exchange.

17. The method of claim 15, wherein the transmissions evaluated by the first client device comprise at least one test signal exchange.

18. The method of claim 15, wherein the first plurality of characteristics include mobility characteristics.

19. The method of claim 15, wherein the first plurality of characteristics include utilization characteristics.

20. The method of claim 15, wherein the first plurality of characteristics include status characteristics.

21. The method of claim 15, wherein the step of receiving a transmission from the access point further includes receiving a first protocol parameter for transmissions received from the access point transceiver circuitry.

22. A wireless network communicatively coupled to a packet switched backbone network, the wireless network comprising:
  an access point having communication interface circuitry that communicatively couples with the packet switched backbone network, access point processing circuitry, and access point transceiver circuitry that transmits at a plurality of power levels;
  the access point processing circuitry managing communication flow between the communication interface circuitry and the access point transceiver circuitry;
  a first client device having first client processing circuitry and first client transceiver circuitry;
  a second client device having second client processing circuitry and second client transceiver circuitry;
  the first client processing circuitry generates a second client reception characteristic based on at least one transmission from the second client transceiver circuitry, and the first client processing circuitry transmits the second client reception characteristic to the access point transceiver circuitry via the first client transceiver circuitry;
  the second client processing circuitry generates a first client reception characteristic based on at least one transmission from the first client transceiver circuitry, and the second client processing circuitry transmits the first client reception characteristic to the access point transceiver circuitry via the second client transceiver circuitry; and
  the access point processing circuitry, based on the second client reception characteristic, selects a first power level of the plurality of power levels for transmissions by the access point transceiver circuitry to the first client transceiver, and the access point processing circuitry, based on the first client reception characteristic, selects a second power level of the plurality of power levels for transmissions by the access point transceiver circuitry to the second client transceiver, and the first power level is greater than the second power level.

23. The wireless network of claim 22, wherein the access point processing circuitry is further operable to select a first protocol parameter for transmissions by the access point transceiver circuitry to the first client transceiver.

24. The wireless network of claim 23, wherein the access point processing circuitry is further operable to select a second protocol parameter for transmissions by the access point transceiver circuitry to the second client transceiver.

25. The wireless network of claim 23, wherein the at least one transmission from the first client transceiver circuitry comprises at least a portion of an ongoing data exchange.

26. The wireless network of claim 23, wherein the at least one transmission from the first client transceiver circuitry comprises at least one test signal exchange.

27. The wireless network of claim 23, wherein the first client device transmits first mobility characteristics to the access point, and the access point processing circuitry assesses at least a portion of the first mobility characteristics along with the first client reception characteristic to generate the first power level of the plurality of power levels.

28. The wireless network of claim 23, wherein the first client device transmits first status characteristics to the access point, and the access point processing circuitry assesses at least a portion of the first status characteristics along with the first client reception characteristic to generate the first power level of the plurality of power levels.

29. The wireless network of claim 23, wherein the first client device transmits first utilization characteristics to the access point, and the access point processing circuitry assesses at least a portion of the first utilization characteristics along with the first client reception characteristic to generate the first power level of the plurality of power levels.

30. A communication network comprising:
  a first device having a first wireless transceiver that transmits at a plurality of power levels;
  a second device having a second wireless transceiver;
  a third device having a third wireless transceiver;

the second device generates a first reception characteristic based on at least one transmission from the third wireless transceiver, and the second device transmits the first reception characteristic to the first wireless transceiver of the first device;

the third device generates a second reception characteristic based on at least one transmission from the second wireless transceiver, and the third device transmits the second reception characteristic to the first wireless transceiver of the first device;

the first device, based on the first reception characteristic, selects a first power level of the plurality of power levels for transmissions by the first transceiver circuitry to the third transceiver circuitry; and the first device, based on the second reception characteristic, selects a second power level of the plurality of power levels for transmissions by the first transceiver circuitry to the second transceiver circuitry, and the first power level is greater than the second power level.

31. The communication network of claim 30, wherein the first device is further operable to select a first protocol parameter for transmissions by the first wireless transceiver to the second device.

32. The communication network of claim 31, wherein the first device is further operable to select a second protocol parameter for transmissions by the first wireless transceiver to the third device.

33. The communication network of claim 30, wherein the at least one transmission from the third wireless transceiver comprises at least a portion of an ongoing data exchange.

34. The communication network of claim 30, wherein the at least one transmission from the third wireless transceiver comprises at least one test signal exchange.

35. The communication network of claim 30, wherein the second device transmits a first mobility characteristic to the first device, and the first device assesses at least a portion of the first mobility characteristic along with the first reception characteristic to generate the first power level of the plurality of power levels.

36. The communication network of claim 30, wherein the second device transmits a first status characteristic to the first device, and the first device assesses at least a portion of the first status characteristic along with the first reception characteristic to generate the first power level of the plurality of power levels.

37. The communication network of claim 30, wherein the second device transmits a first utilization characteristic to the first device, and the first device assesses at least a portion of the first utilization characteristic along with the first reception characteristic to generate the first power level of the plurality of power levels.

38. A wireless communication protocol used by an access point to deliver first data packets to a first wireless device and second data packets to a second wireless device, the wireless communication protocol comprising:

first wireless transmissions by the access point device at a first power targeting both the first wireless device and the second wireless device;

second wireless transmissions by the access point device at a second power level selected to support both delivery of the first data packets to the first wireless device and detection of the second wireless transmissions by the second wireless device, the first power level being greater than the second power level; and third wireless transmissions of at least the second data packets by the access point device at a third power level selected to support receipt of the second data packets by the second wireless device, the second power level being greater than the third power level.

39. The wireless communication protocol of claim 38, wherein the second wireless transmissions are in accordance with a first protocol parameter, the third wireless transmissions are in accordance with a second protocol parameter, and the second protocol parameter is different from the first protocol parameter.

40. A communication network comprising:

a first device having a first wireless transceiver that transmits at a first selected power level;

a second device having a second wireless transceiver that transmits at a second selected power level;

a third device having a third wireless transceiver that transmits at a plurality of power levels;

the second device generates a first reception characteristic based on at least one transmission from the first wireless transceiver, and the second device transmits the first reception characteristic to the third wireless transceiver of the third device;

the first device generates a second reception characteristic based on at least one transmission from the second wireless transceiver, and the first device transmits the second reception characteristic to the third wireless transceiver of the third device;

the third device, based on the first reception characteristic, selects both a first power level of the plurality of power levels for transmissions by the third transceiver circuitry to the first transceiver circuitry, and the first selected power level of the first wireless transceiver circuitry for transmissions by the first wireless transceiver circuitry to the third transceiver circuitry; and the third device, based on the second reception characteristic, selects both a second power level of the plurality of power levels for transmissions by the third transceiver circuitry to the second transceiver circuitry, and the second selected power level of the second wireless transceiver circuitry for transmissions by the second wireless transceiver circuitry to the third transceiver circuitry.

41. The communication network of claim 40, wherein the third device is further operable to select a first protocol parameter for transmissions by the third transceiver circuitry to the first transceiver circuitry.

42. The communication network of claim 41, wherein the third device is further operable to select a second protocol parameter for transmissions by the third transceiver circuitry to the second transceiver circuitry.

43. The communication network of claim 40, wherein the first device transmits a first mobility characteristic to the third device, and the third device assesses at least a portion of the first mobility characteristic along with the first reception characteristic to generate the first power level of the plurality of power levels.

44. The communication network of claim 40, wherein the first device transmits a first status characteristic to the third device, and the third device assesses at least a portion of the first status characteristic along with the first reception characteristic to generate the first power level of the plurality of power levels.

45. The communication network of claim 40, wherein the first device transmits a first utilization characteristic to the third device, and the third device assesses at least a portion of the first utilization characteristic along with the first reception characteristic to generate the first power level of the plurality of power levels.

* * * * *